(12) United States Patent
Katsuki et al.

(10) Patent No.: US 7,783,827 B2
(45) Date of Patent: *Aug. 24, 2010

(54) DATA PROCESSOR HAVING A MEMORY CONTROLLER WITH CACHE MEMORY

(75) Inventors: Fumie Katsuki, Kakamigahara (JP); Takanobu Naruse, Nagoya (JP); Chiaki Fujii, Yokkaichi (JP)

(73) Assignee: Renesas Technology Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/410,437

(22) Filed: Mar. 24, 2009

(65) Prior Publication Data

US 2009/0182943 A1    Jul. 16, 2009

Related U.S. Application Data

(63) Continuation of application No. 11/130,217, filed on May 17, 2005, now Pat. No. 7,519,774.

(30) Foreign Application Priority Data

May 28, 2004    (JP)    ............................ 2004-159510

(51) Int. Cl.
  *G06F 13/00*    (2006.01)
(52) U.S. Cl. .................. 711/109; 711/133; 711/138; 711/144; 711/5; 710/107; 345/557
(58) Field of Classification Search ............. 711/119, 711/105, 138, 144, 120, 121, 122, 5, 133; 710/107; 345/557
See application file for complete search history.

(56) References Cited

U.S. PATENT DOCUMENTS

| | | | |
|---|---|---|---|
| 5,193,166 A | 3/1993 | Menasce | |
| 5,790,839 A | 8/1998 | Luk et al. | |
| 6,327,642 B1 | 12/2001 | Lee et al. | |
| 6,801,208 B2 | 10/2004 | Keshava et al. | |
| 6,847,578 B2 * | 1/2005 | Ayukawa et al. | ....... 365/230.03 |
| 6,859,861 B1 | 2/2005 | Rhodes | |

(Continued)

FOREIGN PATENT DOCUMENTS

JP    10-189889    7/1998

(Continued)

*Primary Examiner*—Hong Kim
(74) *Attorney, Agent, or Firm*—Miles & Stockbridge P.C.

(57) ABSTRACT

The data processor enhances the bus throughput or data throughput of an external memory, when there are frequent continuous reads with a smaller data size than the data bus width of the external memory. The data processor includes a memory control unit being capable of controlling in response to a clock an external memory having plural banks that are individually independently controllable, plural buses connected to the memory control unit, and circuit modules capable of commanding memory accesses, which are provided in correspondence with each of the buses. The memory control unit contains bank caches each corresponding to the banks of the external memory. Thereby, the data processor enhances the bus throughput or data throughput of the external memory, since the data processor stores the data read out from the external memory temporarily in the bank caches and to use the stored data without invalidating them, when performing a continuous data read with a smaller data size than the data bus width of the external memory.

8 Claims, 18 Drawing Sheets

U.S. PATENT DOCUMENTS

| | | |
|---|---|---|
| 6,868,007 B2 | 3/2005 | Hasegawa et al. |
| 6,885,378 B1 | 4/2005 | Tsai et al. |
| 6,918,025 B2 | 7/2005 | Boutaud et al. |
| 6,924,810 B1 | 8/2005 | Tischler |
| 2001/0049771 A1 | 12/2001 | Tischler et al. |
| 2002/0116576 A1 | 8/2002 | Keshava et al. |
| 2002/0199066 A1* | 12/2002 | Chaudhry et al. ........... 711/141 |
| 2004/0107324 A1 | 6/2004 | Nystuen |
| 2005/0050375 A1 | 3/2005 | Novak et al. |
| 2005/0099876 A1* | 5/2005 | Ayukawa et al. ....... 365/230.05 |
| 2005/0253859 A1 | 11/2005 | Takahashi et al. |
| 2009/0182943 A1* | 7/2009 | Katsuki et al. .............. 711/119 |

FOREIGN PATENT DOCUMENTS

| | | |
|---|---|---|
| JP | 2000-132503 | 5/2000 |

* cited by examiner

DATA PROCESSOR HAVING A MEMORY CONTROLLER WITH CACHE MEMORY

CROSS-REFERENCE TO RELATED APPLICATION

This application is a continuation of application Ser. No. 11/130,217 filed May 17, 2005 (now U.S. Pat. No. 7,519,774 issued Apr. 14, 2009). The present application also claims priority from Japanese patent application No. 2004-159510 filed on 28 May 2004, the content of which is hereby incorporated by reference into this application.

BACKGROUND OF THE INVENTION

The present invention relates to a data processor having a memory controller capable of controlling an external memory synchronously with a clock, specifically to a technique effective in use for a microcontroller provided with an interface controller for a DDR-SDRAM (double data rate SDRAM) memory.

The synchronous memory that behaves synchronously with a clock, represented by an SDRAM (Synchronous Dynamic Random Access Memory), is widely used for a frame buffer for graphics and a main memory in a CPU (Central Processing Unit) and so forth. For example, the SDRAM has plural memory banks, and each memory bank has an address decoder, memory array, sense amplifier array, and so forth, and each is made independently controllable. The plural memory banks are configured to behave in pipeline, which makes a high-speed access possible. Especially, the synchronous memory with a DDR configuration performs data input/output with the outside synchronously with both the rise edge and fall edge of a clock, which further increases the access speed compared to the synchronous memory with an SDR (single data rate) configuration. The patent document 1 discloses a multi-bank SDRAM. The patent document 2 discloses a system controller incorporating graphic ports and an SDRAM controller. The synchronous memory is connected to such a system controller that performs the access control thereto.

[Patent Document 1]

Japanese Unexamined Patent Publication No. Hei 10 (1998)-189889

[Patent Document 2]

Japanese Unexamined Patent Publication No. 2000-132503 (FIG. 6)

SUMMARY OF THE INVENTION

The inventors of this application examined a DDR memory controller that incorporates a CPU (central processing unit) performing the access to an externally connected DDR memory (DDR-SDRAM, double data rate SDRAM) and graphic modules, and controls the access to the DDR memory. In case of a DDR memory having 32-bit data input/output terminals, the data that can be read in one clock cycle is 64 bits being double the bus width. However, when an access entity makes a memory access request with a word or long word access data size, most of the data read out from the DDR memory in one clock cycle do not satisfy the request, and they are invalidated. When the access addresses are continuous, there are great possibilities of including data related to subsequent access requests among the invalidated data. For example, when the access data size of a burst access request from a CPU or the like is smaller than the access data size in one clock cycle, and when the memory access in one clock cycle is repeated each time by a designated burst access frequency, there increase data invalidated after being read. In this manner, when the access data size required to the memory controller is smaller than the unit access data size of an external memory, the throughput of the bus was clarified to be deteriorated.

There is a possibility that a cache memory of a CPU displays a certain effect against the deterioration of the bus throughput of an external memory or the data throughput. In such a CPU cache memory, the processing of cache miss penalty in performing entry by a cache miss or replacement of a cache line is considerably heavy; therefore, it becomes important to cover the programs and data being used repeatedly in the cache objects. This being taken into consideration, it is advisable not to cover in a cache object by the CPU cache memory: drawing data relating to a frame buffer, data that are rarely repeatedly used as being represented by image data, and subroutine programs and control data that are hardly frequently used.

Therefore, it is an object of the present invention to provide a data processor capable of enhancing the bus throughput or data throughput of an external memory, when there are frequent continuous reads with a smaller data size than the data bus width of the external memory.

Another object of the present invention is to provide a data processor capable of enhancing the bus throughput or data throughput of an external memory, when there are access requests for data or programs that are not frequently repeatedly accessed, as it is not suitable to cover these in a cache object by the CPU cache memory.

The foregoing and other objects and novel features of the present invention will become apparent from the descriptions and appended drawings of this specification.

The outline of representative one of inventions disclosed in the application will be briefly described as follows.

[1] According to one aspect of the invention, the data processor (semiconductor device) includes: a memory control unit being capable of controlling synchronously with (in response to) a clock an external memory having plural banks that are individually independently controllable, plural buses connected to the memory control unit, and circuit modules capable of commanding memory accesses (circuit modules capable of accessing to the memory) and provided in correspondence with each of the buses. The memory control unit contains bank caches as storage areas each corresponding to the banks of the external memory. The bank caches are capable of storing part of data of the banks concerned by using corresponding bank addresses as associative keys. Thereby, when performing a continuous data read with a smaller data size than the data bus width of the external memory, the data processor is able to store the data read out from the external memory in the bank caches and to use the stored data without invalidating them. Therefore, the data processor is able to enhance the bus throughput or data throughput of the external memory. Since it has the bank caches each corresponding to the banks of the external memory, the data processor is able to make the bank caches retain the data from the banks of the external memory in regard to continuous data reads by operating the plural banks in pipeline.

In a concrete example of this invention, the data processor possesses a CPU as one of the circuit modules and a cache memory located between the CPU and one of the buses. The memory control unit validates the bank caches to an access request for a cache area which is not an objective area of the cache memory (a cache non-objective area). Thereby, the data processor is able to enhance the bus throughput or data throughput, in regard to the data or programs that are not frequently repeatedly accessed, such that if they are a cache object of the cache memory, it will force an intolerable burden by a cache miss penalty, or such that it is not suitable to cover them in the cache object of the CPU cache memory. The data processor is also able to save a complicated control for maintaining the coherency of the data or programs, in such a case that both the CPU cache and the bank caches cover them in the cache object.

In another concrete example of the invention, the external memory is a memory to perform a DDR operation to the clock. The DDR operation will acquire double the read data in a unit clock cycle, as compared to the SDR operation. By using the bank caches to the read data, the data processor will further enhance the throughput of the read data to the external memory. Here, the bank caches have a data storage part corresponding to a data size with which an access to one of the banks of the external memory can be performed in one cycle of the clock. That is, the data processor is able to contribute simplifying the cache control, while securing the latch function to the read data by the DDR operation. The memory control unit invalidates the bank caches to a read access command in which the whole data size of a burst access by one read access command to the external memory exceeds the data size of the data storage part. Thereby, the data processor will further contribute simplifying the cache control. It is advisable to make the number of parallel data bits of the buses equal to the data size being acquired by making the external memory perform the DDR operation in one cycle of the clock. It is preferable in an access control that the size of the data storage part of each bank cache and the size of the bus is matched.

[2] According to another aspect of the invention, the data processor includes: a memory control unit being capable of controlling synchronously with a clock an external memory having plural banks, plural buses connected to the memory control unit, and circuit modules capable of commanding memory accesses and provided in correspondence with each of the buses. The data processor further includes a CPU as one of the circuit modules and a cache memory located between the CPU and one of the buses. Here, the memory control unit contains bank caches each corresponding to the banks of the external memory, and the bank caches are capable of storing part of data of the banks concerned by using corresponding bank addresses as associative keys. The memory control unit validates the bank caches to an access request for a cache non-objective area. When the memory control unit validates the bank caches to a read access request for the external memory from the circuit modules, if the read access request is an associative miss to the bank caches, the memory control unit issues a read command that reads data relating to the associative miss concerned from the external memory, stores the data read by this read command in a corresponding bank cache, and outputs the data to an originator of the read access request. Thereby, when performing a continuous data read with a smaller data size than the data bus width of the external memory, the data processor is able to store the data read out from the external memory temporarily in the bank caches and to use the stored data without making them useless. Therefore, the data processor is able to enhance the bus throughput or data throughput of the external memory. Since it has the bank caches each corresponding to the banks of the external memory, the data processor is able to make the bank caches retain the data from the banks of the external memory in regard to continuous data reads by operating the plural banks in pipeline. The data processor is able to enhance the bus throughput or data throughput, also in regard to the data or programs that are not frequently repeatedly accessed, such that if they are a cache object of the cache memory, it will force an intolerable burden by a cache miss penalty, or such that it is not suitable to cover them in the cache object of the CPU cache memory.

In a concrete example of this invention, when the memory control unit validates the bank caches to a write access request for the external memory from the circuit modules, if the write access request is an associative hit to the bank caches, the memory control unit invalidates cache data relating to the associative hit concerned, and issues a write command for write data relating to the associative hit concerned to the external memory. Thereby, a complicated control for maintaining the coherency between the bank caches and the external memory becomes unnecessary. The memory control unit connected with the plural buses performs the access control to the external memory in response to access requests from the plural circuit modules. However, all the bank caches are not necessarily covered in the cache objects to the access requests from any of the buses. Assuming that this situation is taken into consideration, to maintain the coherency between the bank caches and the external memory will require a complicated control.

If the write access request is an associative miss to the bank caches, the memory control unit only needs to issue the write command for the data relating to the associative miss concerned to the external memory.

In another concrete example of this invention, a graphic module for three-dimensional graphic drawings is connected to another bus as a circuit module, a graphic module for two-dimensional graphic drawings is connected to further another bus as a circuit module, and a display controller is connected to the other bus as a circuit module.

In another concrete example of this invention, there coexist a bus through which a bank cache is validated to an access request and a bus through which a bank cache is invalidated to an access request. For example, in case of the access by a graphic module, it is considered as effective to continuously read the data arranged at continuous addresses on one raster with the maximum burst length. The data size of a series of accesses will exceed the storage capacity of the bank caches. Accordingly, it is advisable to exclude such a bus from the cache object of the bank caches. In contrast, the data size for save or return in the stack area matches with the data processing unit of the CPU and so forth, such as 16 bits or 32 bits. Therefore, it is advisable to include the bus for transferring these data in the cache object.

In another concrete example of this invention, when bus IDs are allocated to the plural buses each, the memory control unit is preferred to include a circuit that defines the bus ID of a bus through which the bank caches are validated to an access request and the bus ID of a bus through which the bank caches are invalidated to an access request. The bus ID is contained in the access request, and is used for the routine of the access request or the routine of a response to the access request. The circuit that defines the bus ID may be configured with hard wired logics, or it may be configured to be programmable by means of a control register. If it is possible to determine whether the bank caches are valid or invalid in units of the buses through which an access request is transferred to the memory control unit, it will contribute enhancing the hit rate of the bank caches.

In another concrete example of this invention, when there is an access request from the circuit modules, the memory control unit may determine whether the bank caches are valid or invalid according to the data size of access data accompanied with the access request. If it is possible to determine whether the bank caches are valid or invalid according to the data size of access data accompanied with the access request to the memory control unit, it will contribute enhancing the hit rate of the bank caches. The memory control unit includes a circuit that defines the access data size by which the bank caches are determined as valid or invalid. Such a circuit that defines the access data size may be configured with hard wired logics, or it may be configured to be programmable by means of a control register.

[3] According to another aspect of the invention, the data processor includes: a memory control unit being capable of controlling synchronously with a clock an external memory having plural banks, a bus connected to the memory control unit, and a circuit module capable of commanding memory accesses and provided in correspondence with the bus. The memory control unit contains bank caches each corresponding to the banks of the external memory, and the bank caches are capable of storing part of data of the banks concerned by using corresponding bank addresses as associative keys. The bus is a bus of the split transaction type. In the split transaction type bus, an access response circuit receives request packets from an access request circuit and replies response packets to the request to the access request circuit. A series of the transaction configured with the request packets and response packets can be identified from the other transactions by means of a transaction ID inherent to the access request circuit. When replying plural read data to the bus in response to commands of plural continuous read accesses to the external memory by the circuit module, the memory control unit is capable of reordering the output order of the read data to a read access request originator, with regard to the command order of the read accesses by the circuit module. This can be achieved because one transaction can be identified from the other transactions by means of the transaction ID inherent to the one transaction.

If the memory control unit should reply the data according to the order of the access requests, that is, if it does not reorder, it will acquire the data in response to the access request that hits on the bank caches earlier than the data in response to the access request that misses on the bank caches; however, it needs to wait until the latter response in order to reply the former response to the access request originator, which in consequence deteriorates the data throughput of the system. Thus, with regard to the order of the read access commands from the circuit module, the memory control unit is capable of outputting the read data from the bank cache that has the association hit on prior to the read data from the external memory relating to the association miss of the bank cache, as the data to the read access request originator. Therefore, it does not need to wait excessively for receiving the reply to the access request.

[4] According to another aspect of the invention, the data processor includes: a memory control unit being capable of controlling synchronously with a clock an external memory having plural banks, a bus connected to the memory control unit, and a circuit module capable of commanding memory accesses and provided in correspondence with the bus. When the circuit module requests a burst read with a smaller access data size than a number of bits of the bus, the memory control unit is capable of issuing read requests continuously to the external memory with a fewer frequency than a burst length of the requested burst read. In other words, in response to an access request from the circuit module that designates a burst length with a smaller access data size than a number of bits of the bus, the memory control unit validates all the data received by one read request to the external memory, and issues read requests plural times continuously. That is, the memory control unit merges the read requests issued to the external memory according to the access requests from the circuit module. For example, when the number of bits of the bus is equal to the data bit number that can be read from the external memory in one clock cycle, and the access data size of the burst read request from the circuit module is 1/n of the number of bits of the bus, the memory control unit merges the read requests from n-circuits to the external memory into the read request of one time. Thereby, the frequency of the read requests that the memory control unit issues to the external memory is reduced to 1/n. The memory control unit validates all the bits of the read data from the external memory every times, and replies the data to the circuit modules according to the requested access data size. Thereby, the bus throughput of the external memory is enhanced, the rate of access conflicts between the circuit modules to the external memory is reduced, and in consequence the data throughput of the system is enhanced.

The following is a brief description of effects obtained by the typical mode of the present invention as disclosed herein.

Thus, according to the invention, the data processor is able to enhance the bus throughput or data throughput of an external memory, when there are frequent continuous reads with a smaller data size than the data bus width of the external memory.

Also, the data processor is able to enhance the bus throughput or data throughput of an external memory, when there are access requests for data or programs that are not frequently repeatedly accessed, as it is not suitable to cover these in a cache object by the CPU cache memory.

DETAILED DESCRIPTION OF THE PREFERRED EMBODIMENTS

Image Processor

Figure 1:
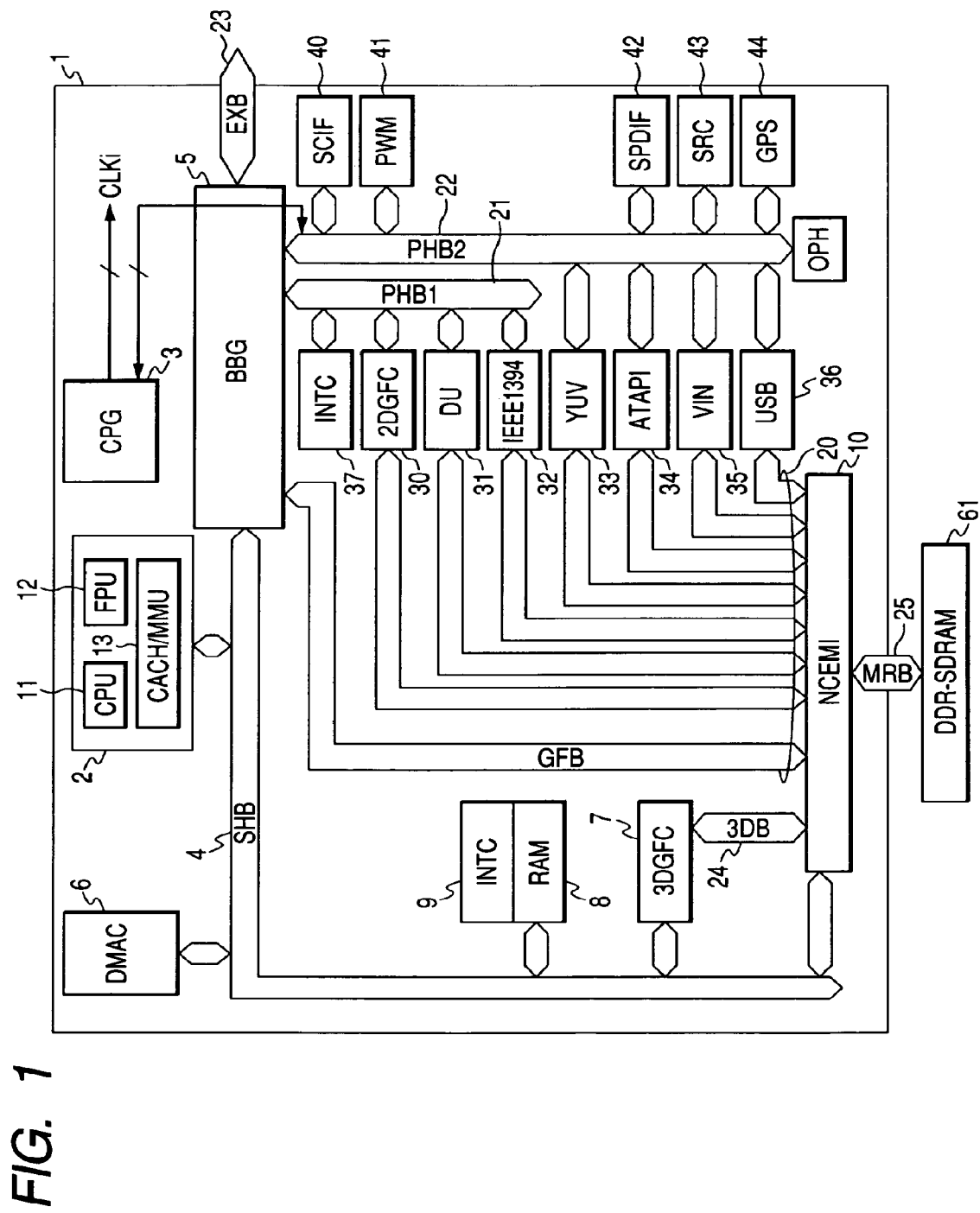
FIG. 1 is a block diagram illustrating an image processor as an example according to the present invention.

FIG. 1 illustrates an image processor as an example according to this invention. An image processor 1 illustrated in the drawing is formed on one semiconductor substrate (semiconductor chip) of a single crystal silicon and the like by means of the manufacturing technique of complimentary MOS (CMOS) integrated circuits, which is not specifically stipulated. The image processor 1 includes image processing and sound processing functions necessary for the car navigation and a DDR-SRAM (Double Data Rate Synchronous Dynamic Random Access Memory) interface and so forth.

The image processor 1 includes a processor core 2 and a clock pulse generator (CPG) 3. The processor core 2 is connected to a super highway bus (SHB) 4. The super highway bus (SHB) 4 is connected with a bus bridge circuit (BBRG) 5, a direct memory access controller (DMAC) 6, a 3D engine (3DGFC) 7 that performs the three-dimensional image processing such as three-dimensional graphic drawings, a RAM (random access memory) 8, an interrupt controller (INTC) 9, and a DDR-SDRAM controller (NCEMI) 10 as a memory controller. The processor core 2 includes a CPU 11 that executes fetched instructions, a floating-point unit (FPU) 12, and a cache memory unit/memory management unit (CACH/MMU) 13. The cache memory unit (CACH) 13 has the associative memory structure that retains data and programs contained in memories and input/output registers arrayed in a cache object address area to be replaceable according to the access frequency. The clock pulse generator (CPG) 3 supplies clocks CLKi for synchronous operation to the relevant units in the image processor 1. Hereunder, the cache memory unit/memory management unit (CACH/MMU) 13 will be abbreviated to the cache memory unit (CACH) 13.

The DDR-SDRAM controller (NCEMI) 10 is connected to a DDR-SDRAM 61, which is used for the main memory or frame buffer of the CPU 11. The bus bridge circuit (BBRG) 5 is connected with a first peripheral bus (PHB1) 21, a second peripheral bus (PHB2) 22, and an external bus (EXB) 23. The 3D engine (3DGFC) 7 is connected to the DDR-SDRAM controller (NCEMI) 10 through a 3D bus (3 DB) 24. Further, the DDR-SDRAM controller (NCEMI) 10 is also connected to a graphic bus (GFB) 20. The DDR-SDRAM controller (NCEMI) 10 is connected to a DDR memory bus (MRB) 25 outside the image processor 1.

The super highway bus (SHB) 4 is a bus of the multi-master bus type or the split transaction type. Each of the circuit modules connected to the super highway bus (SHB) 4 possesses a master port and a slave port independently. That is, the read/write transfer request from their own circuit modules is issued from the master port as a request packet. The transfer request from the other circuit modules is arbitrated by a bus arbitration circuit. As the result of the arbitration, the request packet is notified to the slave port, and the bus transaction is executed accordingly. The bus arbitration circuit is not illustrated in the drawing, which is located on the way of the super highway bus (SHB) 4. This multi-master bus control system enables the super highway bus (SHB) 4 to transfer the requests from all the combinations of the circuit modules connected thereto. For example, the transfers become possible between the CPU 11 and the DMAC 6, between the bus bridge circuit (BBRG) 5 and the DDR-SDRAM controller (NCEMI) 10, and between the bus bridge circuit (BBRG) 5 and the CPU 11, and so forth.

The 3D engine (3DGFC) 7 receives the image processing command such as a 3D drawing command from the CPU 11 by way of the super highway bus (SHB) 4 to thereby execute the 3D drawing processing. The drawing processing is executed to a frame buffer area of the DDR-SDRAM 61, which is not illustrated.

The DDR-SDRAM controller (NCEMI) 10 is also connected to the graphic bus 20. The graphic bus 20 is connected with a 2D engine (2DGFC) 30 that performs the two-dimensional image processing, a display control unit (DU) 31, a serial interface circuit (IEEE1394) 32, a color space conversion unit (YUV) 33, an AT attachment packet interface circuit (ATAPI) 34, a video input circuit (VIN) 35, and a universal serial bus function controller (USB) 36, and so forth. The display control unit (DU) 31 sequentially reads out the image data drawn in the frame buffer area, and controls to output the image data to a raster-scan type display synchronously with display timing. The video input circuit (VIN) 35 inputs digital video signals. The AT attachment packet interface circuit (ATAPI) 34 performs the interface control with the disk drives such as a hard disk drive, DVD drive, CD-ROM drive, and so forth.

The graphic bus 20 is a bus of the split transaction type in the same manner as the super highway bus 4; however, one of the source and destination of transfer data is necessarily the DDR-SDRAM controller 10. That is, the bus bridge circuit 5, 2D engine 30, display control unit 31, serial interface circuit 32, color space conversion unit 33, AT attachment packet interface circuit 34, video input circuit 35, and universal serial bus function controller 36 perform only the transfers between the DDR-SDRAM 61 and themselves by way of the DDR-SDRAM controller 10. When the image processing circuit modules such as the 2D engine 30 perform the image processing in their own circuit blocks, the results have to be stored temporarily in the DDR-SDRAM 61 or the data in the DDR-SDRAM 61 have to be transferred to the display control unit 31. Thus, all the transfers are performed by way of the DDR-SDRAM controller 10.

The first peripheral bus 21 is connected with an interrupt controller (INTC) 37, the 2D engine 30, the display control unit 31, and the serial interface circuit 32.

The second peripheral bus 22 is connected with a pace-synchronization serial communication interface circuit (SCIF) 40, a pulse width modulation timer (PWM) 41, an IEC60958 audio controller (SPDIF) 42, a source rate comparator (SRC) 43, a GPS (Global Positioning System) searching/tracking engine (GPS) 44, and the clock pulse generator 3.

The first peripheral bus 21 and the second peripheral bus 22 are a 32-bit bus of the single master, and the bus bridge circuit 5 is the bus master.

The CPU 11 is a 32-bit CPU as an example, which performs the data processing in units of 32 bits. The CPU 11 has a super-scalar structure capable of issuing plural instructions in one cycle; thereby, it has the instruction execution capability by the processing speed corresponding to double the operational frequency. That is, the CPU 11 has the so-called two-way super scalar structure. In correspondence with this, the super highway bus 4 is a 64-bit bus. Thus, the CPU 11 is capable of executing two instructions in parallel to prepare two pairs of 32-bit data, and transferring the two pairs of the data, 64 bits in total, to the super highway bus 4 in one bus cycle. Also, the CPU 11 is capable of reading 64-bit data from the super highway bus 4 in one bus cycle, and processing the lower 32 bits and upper 32 bits of the read 64-bit data separately in parallel.

Figure 2:
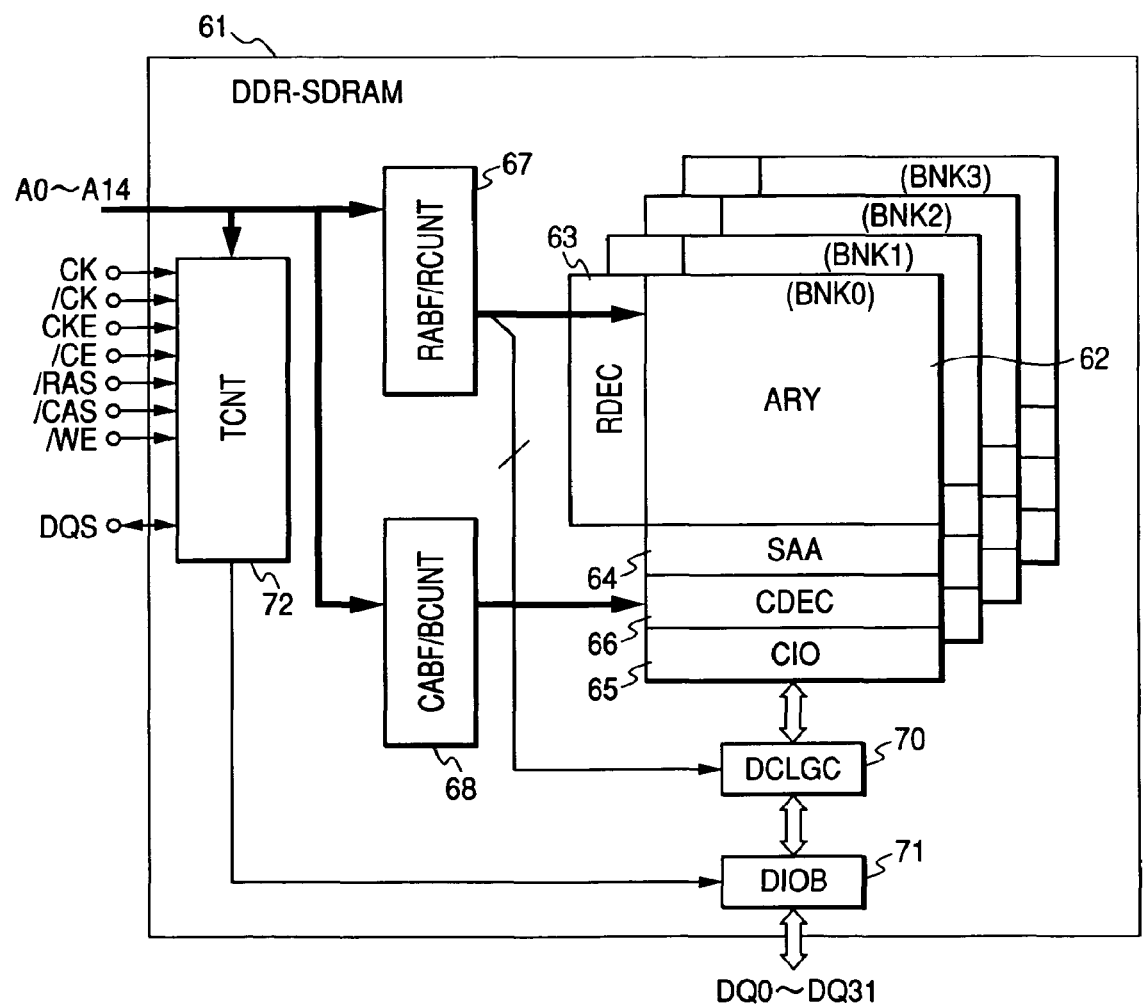
FIG. 2 is a schematic block diagram of a DDR-SDRAM relating to the example.

FIG. 2 illustrates a schematic block of the DDR-SDRAM 61. The DDR-SDRAM 61 has four memory banks BNK 0 to BNK 3, which is not specifically restricted. Each of the memory banks BNK 0 to BNK 3 includes a memory array (ARY) 62, a row address decoder (RDEC) 63, a sense amplifier array (SAA) 64, a column input/output circuit (CIO) 65, and a column address decoder (CDEC) 66. The memory array 62 each includes multiple dynamic memory cells arrayed in matrix. The selected terminals of the memory cells are connected to the word lines by columns each. The data input/output terminals of the memory cells are coupled with one-sided pairs of the complimentary bit lines folded back through the sense amplifier.

A row address buffer/refresh counter (RABF/RCUNT) 67 supplies the row address decoder 63 with internal row addresses. A column address buffer/burst counter (CABF/BCUNT) 68 supplies the column address decoder 66 with internal column addresses. The internal row addresses and the internal column addresses are supplied to the memory banks that are selectively activated. The column input/output circuit 65 is selectively connected to a data input/output buffer (DIOB) 71 by way of a data control logic (DCLGC) 70, and is capable of outputting read data and inputting write data in units of the memory banks. The data input/output buffer 71 is connected with 32-bit data input/output terminals DQ 0 to DQ 31.

The DDR-SDRAM 61 possesses 15-bit address input terminals A 0 to A 14, for example. The row address signals and bank selection signals supplied to the address input terminals A 0 to A 14 in the address multiplex form are supplied to the row address buffer 67, the column address signals are supplied to the column address buffer 68, and the mode register setting information is supplied to a timing controller (TCNT) 72. The operations of the four memory banks BNK 0 to BNK 3 are made active according to the logic value of a two-bit bank selection signal. The operations of the memory banks BNK 0 to BNK 3 are made controllable independently.

The timing controller 72 performs the operation control of the DDR-SDRAM 61. The timing controller 72 is supplied with the mode register setting information as well as the external control signals such as clock signals CLK, /CLK, a clock enable signal CKE, a chip selection signal /CS, a column address strobe signal /CAS, a row address strobe signal /RAS, a write enable signal /WE, and a data strobe signal DQS. The operation of the DDR-SDRAM 61 is determined according to the command specified by the combinations of states of these input signals. The timing controller 72 includes a control logic that forms an internal timing signal corresponding to the operation instructed by the command.

The clock signals CLK, /CLK are the master clock of the DDR-SDRAM 61. The other external input signals are made significant when they are synchronized with the rise edge of the clock signal CLK concerned. The chip selection signal /CS designates to start the command input cycle by the low level thereof. The column address strobe signal /CAS, row address strobe signal /RAS, and write enable signal /WE each are the signal that defines the command cycle. The data strobe signal DQS as the input signal is supplied from the outside as the write strobe signal during the write operation, which specifies the definite timing of write data. The data strobe signal DQS as the output signal varies synchronously with the output of read data, and functions as the read strobe signal. The output timing of the read data and the variation of the output signal DQS are made synchronized with the clock signal CLK by using a DLL (digital locked loop) circuit, which is omitted from the drawing. The DLL circuit generates an internal clock signal in which the signal transmission delay characteristics of the internal circuits to the clock CLK are compensated by means of the replica circuit technique and the phase synchronization technique, which is not specifically restricted. The DLL circuit outputs the read data synchronously with the internal clock signal as well as varies the clock of the output signal DQS. In consequence, the phase of the clock CLK is made coincident with that of the clock of the output signal DQS with a high-precision.

The access command includes a row address strobe bank active command (RASBA command), a column address read command (CAR command), and a column address write command (CAW command) and so forth.

The RASBA command is a command that validates a selection of the memory banks and a designation of the row address of the selected memory bank. This command is to select the word line of the designated memory bank, and to connect the memory cell connected to the word line concerned with the corresponding complimentary data line.

The CAR command is a command that gives a column address of the read operation. This command is to fetch the column address signal in the column address buffer, and to execute the column system selection operation. In the column system selection operation after a burst operation, the column address having received an increment in the burst counter is used. In the column system selection operation, the bit line selection operation in units of 64 bits is performed in the memory bank that is already activated by the RASBA command. The data of the selected bit lines are outputted continuously to the outside in units of 32 bits, synchronously with the rise edge and fall edge of the output signal DQS. The frequency of the continuous readout is the frequency designated by the bust length. In case of the DDR-SDRAM 61, the burst length is a multiple of integer 2. The start of data readout from the data output circuit is performed after the number of cycles of the clock signal CLK specified by the CAS latency time.

The CAW command is a command that gives a column address of the write operation. This command is to turn the fetched column address signal into the write start address to the memory bank activated. In this write start address, the write data supplied in units of 32 bits synchronously with the rise edge and fall edge of the input signal DQS are written in units of 64 bits. The write operation does not include the setting of the CAS latency. The fetching of write data is started synchronously with the data strobe signal DQS, with a delay for one cycle of the clock signal CLK from the CAW command cycle concerned.

In the DDR-SDRAM 61, when a burst operation is performed in one memory bank, another memory bank is designated on the way, and the row address strobe bank active command is supplied, the row address system operation in the another memory bank concerned is enabled without giving any influences to the operation of the one memory bank concerned that is under execution. That is, the row address system operation designated by the bank active command and so forth and the column address system operation designated by the column address write command and so forth are enabled in parallel between different memory banks. Therefore, as long as there does not occur a data collision on the data input/output terminals DQ 0 to DQ 31, during execution of a command with the processing uncompleted, it is possible to issue a pre-charge command and/or the RASBA command to a memory bank different from the memory bank being the processing object of the command concerned under execution, to thereby start the internal operation in advance. The DDR-SDRAM 61 is able to input and output the data that is synchronized with both the rise and fall edges of the data strobe signal DQS being synchronized with the clock signal CLK; and it is also able to input and output the address and control signals synchronously with the clock signal CLK. Accordingly, the DDR-SDRAM 61 is able to operate a bulk memory having as large capacity as the DRAM at a high-speed comparable to the SRAM. It is also able to read or write plural data continuously, by designating how many data are accessed to one selected word line according to the burst length and switching the selection state of the column system sequentially by using the integrated column address counter.

[DDR-SDRAM Controller]

Figure 3:
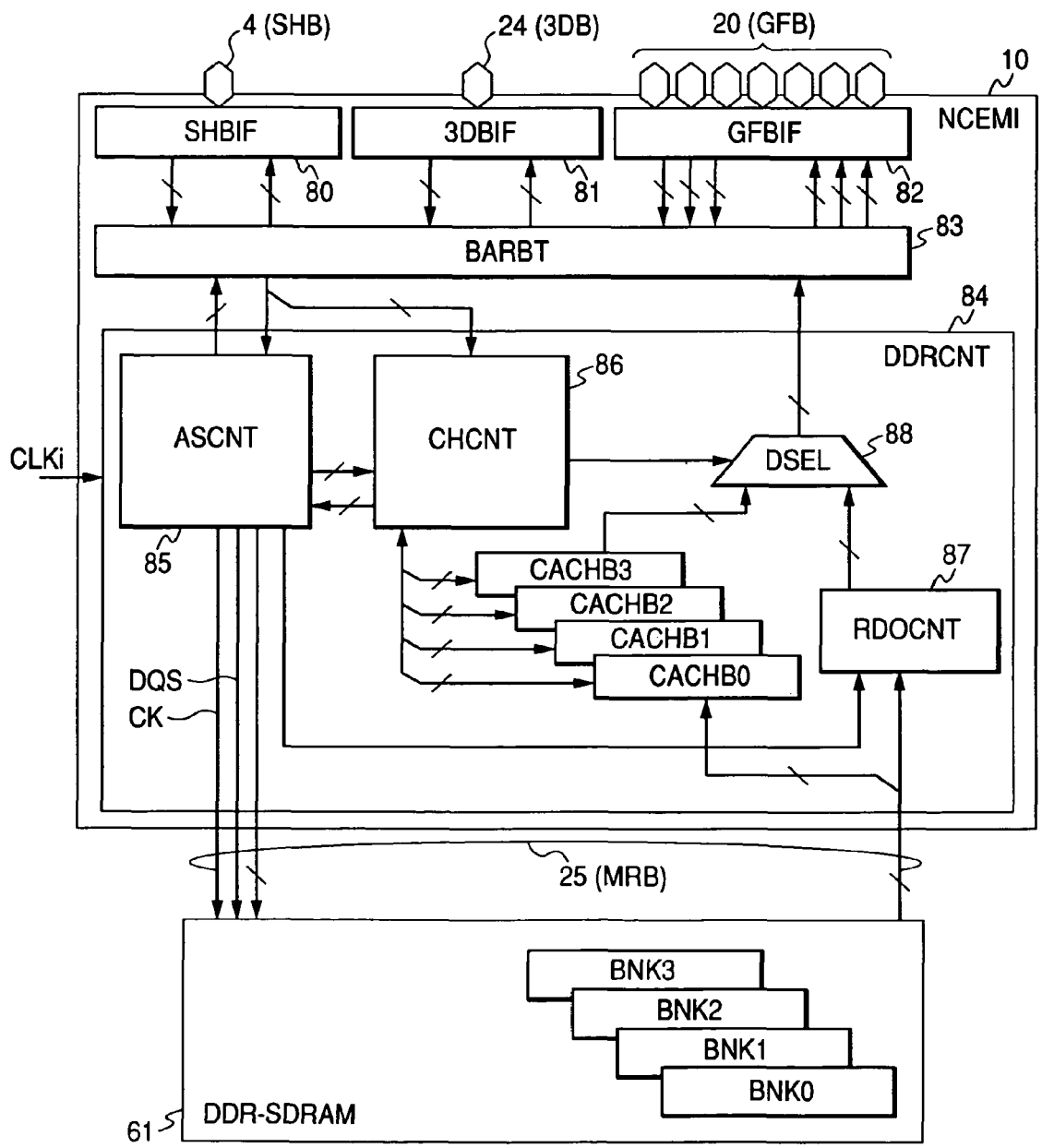
FIG. 3 is a schematic block diagram of a DDR-SDRAM controller relating to the example.
Figure 4:
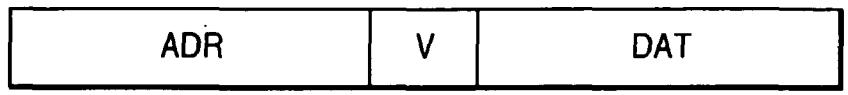
FIG. 4 is an illustration of a data structure relating to the cache entry of a bank cache.

FIG. 3 illustrates a block diagram of the DDR-SDRAM controller 10. The DDR-SDRAM controller 10 includes a super highway bus interface (SHBIF) 80, a 3D bus interface (3 DBIF) 81, a graphic bus interface (GFBIF) 82, a bus arbiter (BARBT) 83, and a DDR controller (DDRCNT) 84.

The super highway bus interface (SHBIF) 80 is connected with the super highway bus (SHB) 4. The 3D bus interface (3 DBIF) 81 is connected with the 3D bus (3 DB) 24. The graphic bus interface (GFBIF) 82 is connected with the graphic bus 20. The graphic bus 20 is configured as a dedicated bus between the modules of 128 bits to 32 bits. The above interfaces 80 through 83 have the master port and slave port, and execute the bus transactions of the split transaction buses. The bus arbiter 83 arbitrates data transfers or packet transfers between the circuit modules connected with the above interfaces 80 through 82 and the DDR controller (DDRCNT) 84.

The DDR controller 84 controls the issuing of commands synchronized with the clock to the DDR-SDRAM 61 and controls the data input/output operation, so as to satisfy the access request arbitrated by the bus arbiter 83. The basic control of the DDR controller 84 is the access control of a general DDR-SDRAM to the burst read operation and write operation of the DDR-SDRAM 61. The control logics thereof are contained in a DDR access controller (ASCNT) 85. The DDR controller 84 is characterized by including bank caches CACHB 0 to CACHB 3 as storage areas, respectively corresponding to the memory banks BNK 0 to BNK 3 of the DDR-SDRAM 61. The bank caches CACHB 0 to CACHB 3 are able to store part of data of the banks concerned, by using the corresponding bank addresses as the associative keys. The control logics of the bank caches CACHB 0 to CACHB 3 are contained in a cache controller (CHCNT) 86. In addition to the above, the DDR controller 84 includes an output controller (RDOCNT) 87 for the read data, and a selector (DSEL) 88 that selects the data from the bank caches CACHB 0 to CACHB 3 and the data from the DDR-SDRAM 61. Hereunder, any one of the bank caches CACHB 0 to CACHB 3 is also denoted as bank cache CACHB, or the bank cache CACHB is also used as the generic name of these caches.

Each of the bank caches CACHB 0 to CACHB 3 has an address part ADR, an address part V, and a data part DAT. The data part DAT is a storage area with the data size that can be accessed in one cycle of the clock DQS to the DDR-SDRAM 61. In concrete, the data size is 64 bits. In the address part ADR is stored the address in which is defined a region designated by one row address and two column addresses to the memory banks of the DDR-SDRAM 61, namely, the column address excluding the row address and the least significant bit thereof. In the address part V is stored the valid bit that shows the validity of the bank cache concerned. Each of the bank caches CACHB 0 to CACHB 3 can retain one cache entry. The bank caches CACHB 0 to CACHB 3 are configured with an SRAM (static random memory) and registers and so forth.

[Bank Cache]

The control mode to the bank caches by the cache controller (CHCNT) 86 will be described. The access request supplied after arbitration by the bus arbiter 83 contains a transaction ID, bus ID specifying the bus by which the access request is transferred, access command indicating the class of the access, access address, burst length, write data in case of the write access.

The cache controller 86 enables the bank cache CACHB to operate, when the access address is a cache non-objective area. When the access address is a cache objective area, the cache controller 86 does not permit the bank cache CACHB to operate. Thereby, the bus throughput or the data throughput can be enhanced in regard to the data and/or programs: such that frequent and repeated accesses are rare, such that if they are covered in the cache object of the CPU cache memory 13, it will force an intolerable burden by a cache miss penalty, or such that to cover them in the cache object of the CPU cache memory 13 is not suitable. Further, if the data and/or programs are covered in the cache objects of both the CPU cache memory 13 and the bank cache CACHB, it will save a complicated control for maintaining the coherency of stored information.

Further, the cache controller 86 restricts the bus that enables the bank cache CACHB to operate to an access request. For example, the cache controller 86 enables the bank caches CACHB 0 to CACHB 3 to operate only to the access request from the super highway bus (SHB) 4. For example, in case of the access by a graphic module such as the 3D engine (3DGFC) 7 or the 2D engine (2DGFC) 30, it is considered as effective to continuously read the data arranged at continuous addresses on one raster with a large burst length. The data size of a series of accesses by the above will exceed the storage capacity of the bank cache CACHB. Accordingly, it is advisable to exclude such a bus from the cache object of the bank cache. In contrast, the data size for save or return in the stack area matches with the data processing unit of the CPU 11 and so forth, such as 16 bits or 32 bits. Therefore, it is advisable to include the super highway bus (SHB) 4 for transferring these data in the cache object.

Further, the cache controller 86 does not permit the bank caches CACHB 0 to CACHB 3 to operate, with regard to such a read access command that the data size of all the accesses contained in a burst access by one read access command to the DDR-SDRAM 61 exceeds the size of one bank cache CACHB. In short, the cache controller 86 does not permit the bank caches CACHB 0 to CACHB 3 to operate, unless the access by one read access command to the DDR-SDRAM 61 is the burst length 2. This construction will save a complicated control to such an access that the burst read data length from one memory bank exceeds the storage capacity of the data part DAT of one bank cache CACHB.

When permitting the bank caches CACHB 0 to CACHB 3 to operate, the cache controller 86 looks up the bank cache CACHB corresponding to the accessed address, and determines whether the address of the address part ADR corresponds to the accessed address and whether the valid bit of the address part V is valid or not. When the address is judged to correspond to the accessed address and the valid bit is judged as valid, the access is judged as cache hit. Otherwise, it is judged as cache miss.

In the read operation, if it is cache hit, the cache controller 86 restrains the DDR access controller 85 from issuing the memory read command to the DDR-SDRAM 61, reads out the data in the data part DAT of the corresponding one bank cache CACHB, and makes the selector 88 select this. The read data outputted from the DDR controller 84 are returned to the bus access request originator as the reply packet by way of the super highway bus interface (SHBIF) 80 or the like that connects with the access request originator. If it is cache hit, it will save the memory access to the DDR-SDRAM 61, which contributes to enhancing the bus throughput of the DDR memory bus (MRB) 25, and enhancing the data throughput of the read access.

In the read operation, if it is cache miss, the DDR access controller 85 performs a read access by the accessed address relating to the miss to the DDR-SDRAM 61, and returns read accessed data to the bus access request originator as the reply packet by way of the super highway bus interface (SHBIF) 80 or the like that connects with the access request originator. The cache controller 86 stores the read accessed data in the data part DAT of the bank cache CACHB corresponding to the memory bank, updates the address in the corresponding address part ADR into the accessed address concerned, and sets the valid bit in the corresponding address part V to the value indicating the validity.

In the write operation, if it is cache hit, the DDR access controller 85 invalidates the data of the one bank cache CACHB relating to the hit. That is, the DDR access controller 85 modifies the valid bit in the address part V of the corresponding bank cache CACHB into the value indicating the invalidity. At the same time, the DDR access controller 85 issues the write command of the write data relating to the hit to the DDR-SDRAM 61. In the write operation, if it is cache miss, the DDR access controller 85 issues the write command of the write data relating to the miss to the DDR-SDRAM 61. Thereby, a complicated control becomes unnecessary which maintains the coherency of data between the DDR-SDRAM 61 and the bank caches CACH 0 to CACHB 3. The DDR-SDRAM controller 10, being connected with the plural buses, performs the access control to the DDR-SDRAM 61 in response to the access requests from the plural circuit modules. Here, the DDR-SDRAM controller 10 does not necessarily cover all the access requests from these buses in the cache object of the bank caches CACH 0 to CACHB 3. This is because this case needs a complicated control for maintaining the data coherency between the DDR-SDRAM 61 and the bank caches CACH 0 to CACHB 3.

Figure 5:
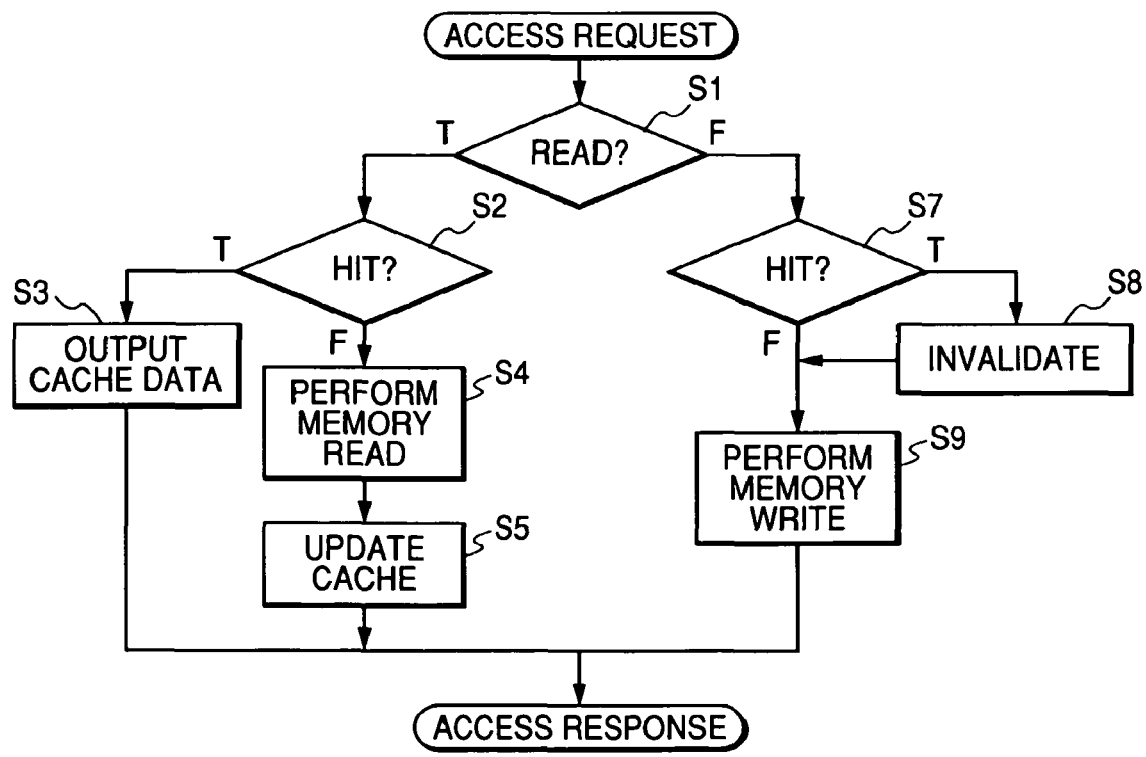
FIG. 5 is an illustration of a control processing flow when the DDR-SDRAM controller attains the cache hit and cache miss.

FIG. 5 illustrates a flow of the control processing when the DDR-SDRAM controller 10 attains the cache hit and cache miss of the bank caches CACH 0 to CACHB 3. When there appears an access request, the DDR-SDRAM controller 10 judges whether it is a read access or not (S1). If it is a read access and a bank cache hit (T at S2), the DDR-SDRAM controller 10 makes the DDR-SDRAM 61 output the data relating to the cache hit (S3). If it is a cache miss (F at S2), the DDR-SDRAM controller 10 performs the memory read to the DDR-SDRAM 61 (S4), and updates the bank cache relating to the cache miss (S5). If it is a write access and a bank cache hit (T at S7), the DDR-SDRAM controller 10 invalidates the bank cache relating to the cache hit (S8), and performs the memory write to the DDR-SDRAM 61 (S9). If it is a cache miss (F at S7), the processing moves directly to the memory write to the DDR-SDRAM 61 (S9).

Figure 6:
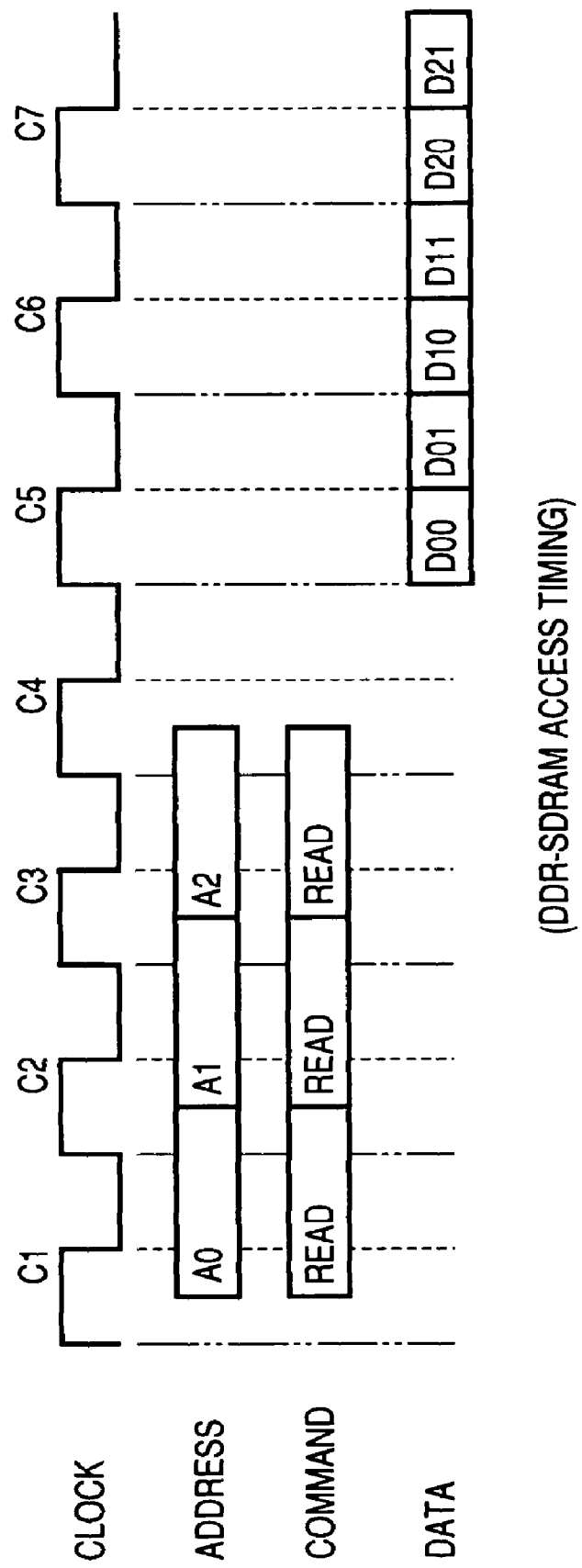
FIG. 6 is a timing chart illustrating a typical access timing of the DDR-SDRAM.

FIG. 6 illustrates a typical access timing of the DDR-SDRAM 61. At each cycle of clock cycles C1, C2, and C3, addresses are designated and read commands with the burst length 2 are issued. After issuing the commands, with an interval within which the internal operation of the DDR-SDRAM 61 is stabilized, the read data are outputted at each of half the clock cycles C5, C6, and C7 in units of 32 bits.

Figure 7:
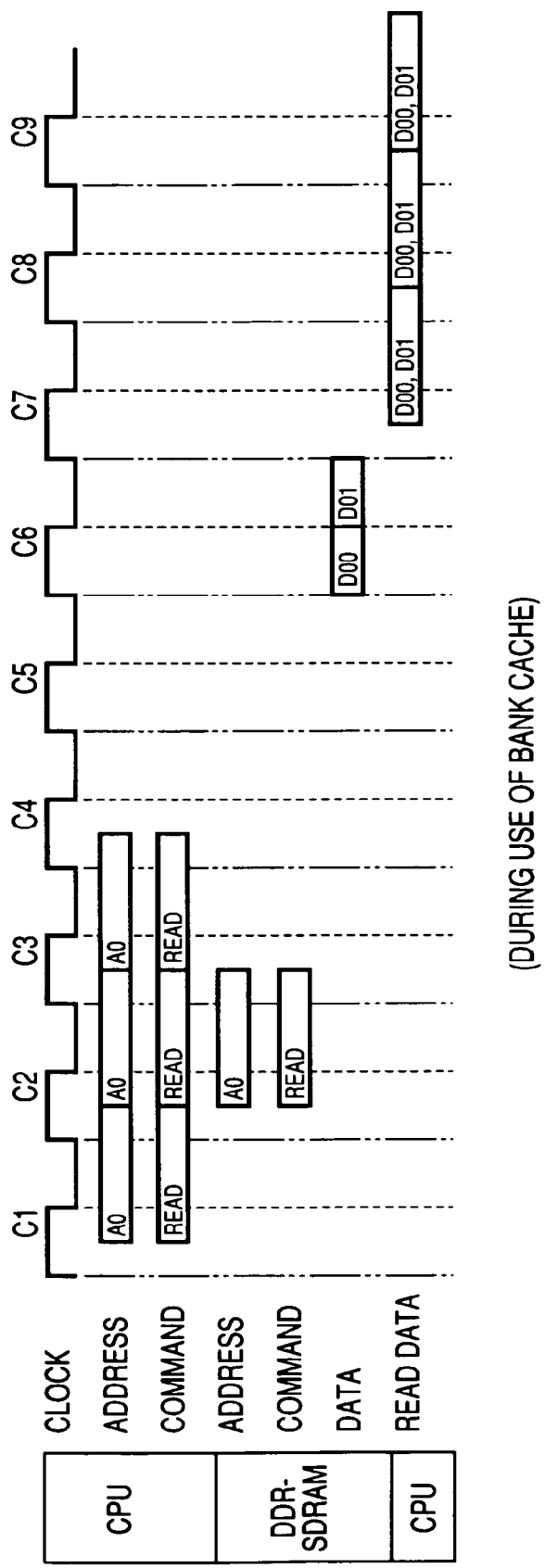
FIG. 7 is a timing chart when the read access with 16-bits access data size is requested three times to continuous addresses from a super highway bus.

FIG. 7 illustrates a timing chart when the read access with 16-bits access data size is requested three times to continuous addresses from the super highway bus (SHB) 4. The continuous addresses of the data with units of 16 bits are the host and common address in units of 64 bits. In FIG. 7, such a common address is shown by A0. For example, as the read access request of the access address A0 is supplied at the clock cycles C1, C2, and C3 three times continuously from the CPU 11 by way of the super highway bus (SHB) 4, the DDR-SDRAM controller 10 judges whether the access request is cache hit or cache miss of the bank cache. If it is the first access request, it is judged as cache miss, and the DDR-SDRAM controller 10 issues the read access command of the access address A0 to the DDR-SDRAM 61 at the clock cycle C2. After issuing the command, with an interval within which the internal operation of the DDR-SDRAM 61 is stabilized, the read data D0, D01 are outputted from the DDR-SDRAM 61 synchronously with the clock cycle C6 at each of half the clock cycle in units of 32 bits. The access requests at the clock cycles C2, C3 attain the cache hits of the bank caches CACHB 0 to CACHB 3 contained in the DDR-SDRAM controller 10; accordingly, the DDR-SDRAM controller 10 does not issue the memory access command to the DDR-SDRAM 61. The read data as the access response to the CPU 11 are the 16 bit-data of continuous addresses being sliced from the data D00, D01 that each of the bank caches CACHB retains. The drawing shows all the data relating to the bank cache hit in regard to the response data replied at the clock cycles C7, C8, and C9, as indicated by D00, D01 for convenience. Thereby, the throughput of the DDR memory bus (MRB) 25 is enhanced.

Figure 8:
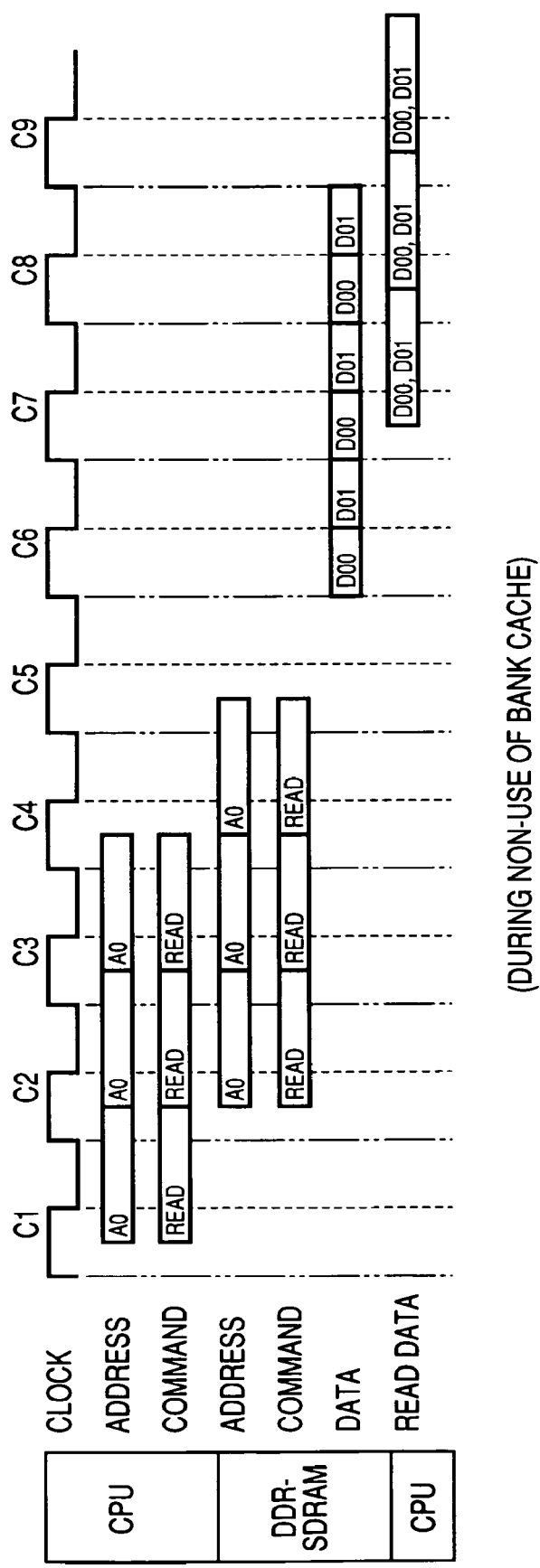
FIG. 8 is a timing chart illustrating the operation without using the bank caches to the same access request as that in FIG. 7.

FIG. 8 illustrates a timing chart in the operation that does not use the bank caches to the same access request as that in FIG. 7. The access requests are issued at the clock cycles C1, C2, and C3 from the CPU 11, the access commands in response to the access requests are issued directly to the DDR-SDRAM 61 at the clock cycles C2, C3, and C4, and the read data are transferred to the CPU 11 at the clock cycles C7, C8, and C9. In comparison to FIG. 7, the time for occupying the DDR memory bus (MRB) 25 is elongated, and the bus throughput is lowered accordingly.

Figure 9:
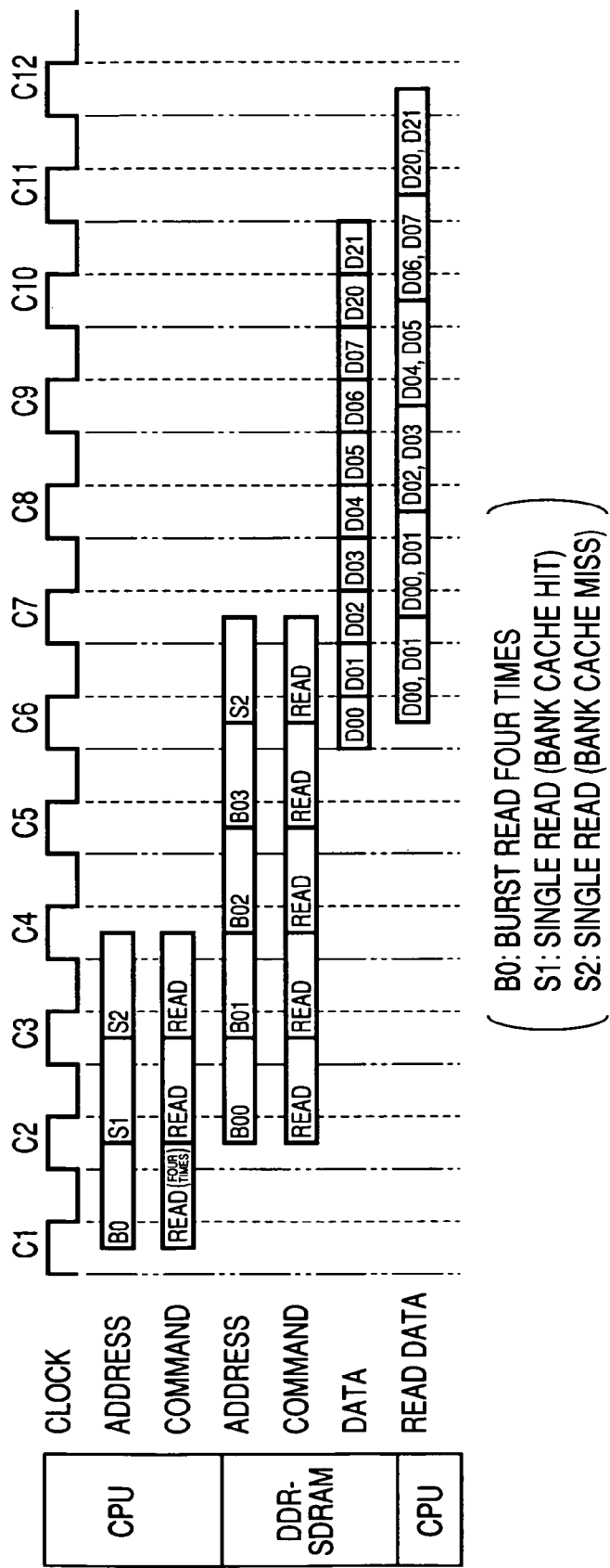
FIG. 9 is a timing chart illustrating the operation that the DDR-SDRAM controller reorders the data of bank cache hit to the access requests with burst read and single read from the super highway bus, and replies the acquired data to the access request originator.

FIG. 9 illustrates a timing chart in the operation that the DDR-SDRAM controller 10 reorders the data of bank cache hit to the access requests with burst read and single read from the super highway bus (SHB) 4, and replies the acquired data to the access request originator. The access request issued from the CPU 11 at the clock cycle C1 is a read access with the burst length 4, the leading address of which is B0. Following this, the CPU 11 issues the access requests with single read of the addresses S1, S2, at the clock cycles C2, C3. With regard to the access request with burst read, since the data size of all the access data exceeds the storage capacity of the bank caches, the DDR-SDRAM controller 10 does not cover the access request in the cache object of the bank caches, and issues the read commands (burst length 2) of the addresses B00, B01, B02, and B03 sequentially from the clock cycle C2 to the DDR-SDRAM 61. In response to the read commands, the DDR-SDRAM 61 is to output the read data D00, D01, D02, D03, D04, D05, D06, and D07 sequentially from the clock cycle C6 at each of half the clock cycle in units of 32 bits. Here, the single read of the address S1 hits on the bank cache. Accordingly, the DDR-SDRAM controller 10 does not issue the access command relating to the single read concerned to the DDR-SDRAM 61, and acquires the data D10, D11 relating to the hit from the bank cache. Since the timing of acquiring the data D10, D11 is earlier than the timing when the DDR-SDRAM 61 replies the read data D00, D01 to the CPU 11, the DDR-SDRAM controller 10 replies the data D00, D01 relating to the bank cache concerned to the CPU 11 in advance at the clock cycle C6. Since the single read of the address S2 is the bank cache miss, the DDR-SDRAM controller 10 issues the read command (burst length 2) of the address S2 to the DDR-SDRAM 61 at the clock cycle C6. The data outputs D20, D21 from the DDR-SDRAM 61 that reply to this read command are synchronized with the clock cycle C10. The DDR-SDRAM controller 10 replies the read data D00, D01, D02, D03, D04, D05, D06, D07, D20, and D21 from the DDR-SDRAM 61 to the CPU 11, sequentially after the clock cycle C7.

Thus in FIG. 9, it is possible to reply the read data D10, D11 corresponding to the access request with single read S1 being the bank cache hit to the CPU 11 of the access request originator during the read latency cycle of the DDR-SDRAM 61. Thereby, the bus throughput is enhanced to the access by the CPU 11 and the bus throughput is enhanced to the DDR-SDRAM 61.

Especially in this case, the super highway bus 4 is of the split transaction type and it conforms to the reordering of the read data; therefore, the super highway bus interface 80 is able to transfer the reply data D10, D11 relating to the access request with single read S1 at the clock cycle C6, prior to the reply to the access request relating to the burst read B0.

In the split transaction type bus, an access response circuit receives request packets from an access request circuit and replies response packets to the request to the access request circuit. A series of the transaction configured with the request packets and response packets can be identified from the other transactions by means of a transaction ID inherent to the access request circuit. When replying plural read data in response to plural continuous read access commands to the external memory from the circuit modules, the DDR-SDRAM controller 10 is able to reorder the output order of the read data to the read access request originator, with regard to the command order of the read accesses by the circuit modules. This is because one transaction can be identified from the other transactions by means of the transaction ID inherent to the one transaction.

If the DDR-SDRAM controller 10 should reply the plural data according to the order of the access requests, that is, if it does not reorder, it will acquire the data in response to the access request that hits on the bank cache CACHB earlier than the data in response to the access request that misses on the bank cache CACHB; however, it needs to wait until the reply of the latter data in order to reply the former data to the access request originator, which in consequence deteriorates the data throughput of the system. Thus, with regard to the order of the read access commands from the circuit modules, the DDR-SDRAM controller 10 is made capable of outputting the read data from the bank cache CACHB relating to the bank cache hit prior to the read data from the DDR-SDRAM 61 relating to the bank cache miss as the data to the read access request originator. Therefore, it does not need to wait excessively for receiving the reply to the access request.

Figure 10:
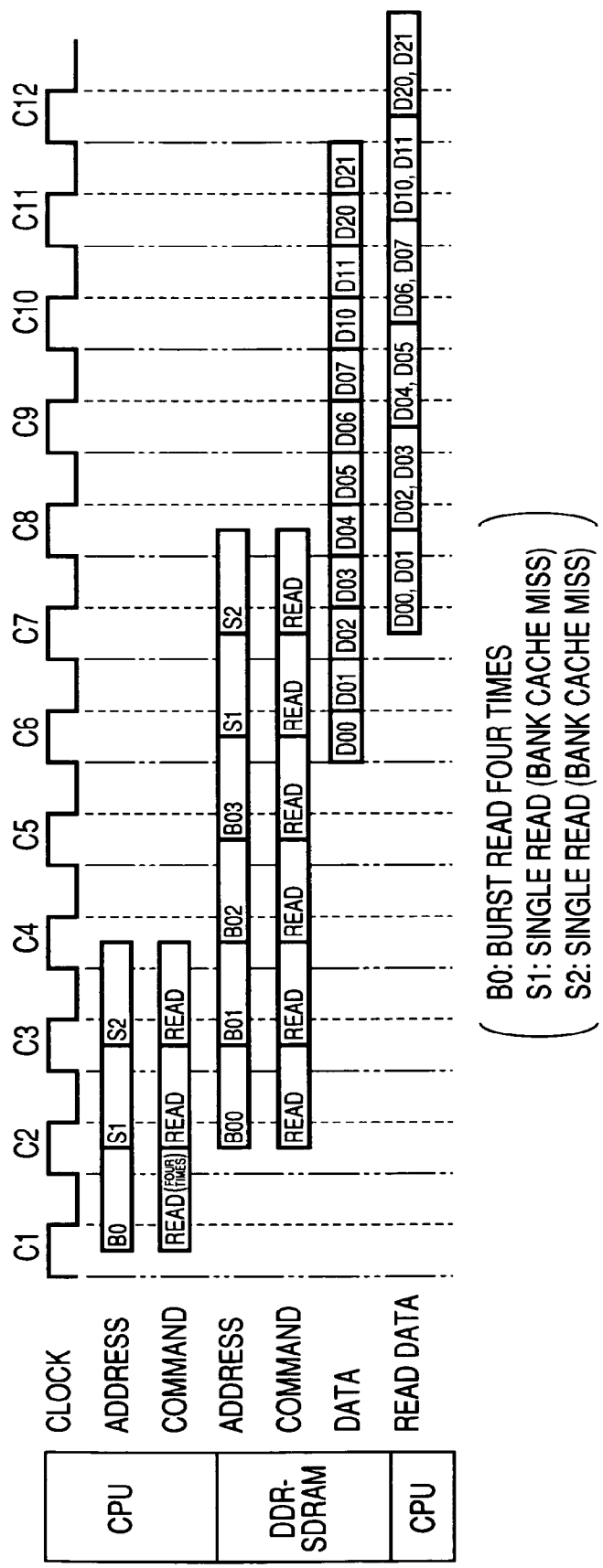
FIG. 10 is a timing chart illustrating the operation of a comparison example in which the single read relating to S1 in FIG. 9 is regarded as a bank cache miss.

FIG. 10 illustrates the operation timing in which the single read relating to S1 in FIG. 9 is regarded as a bank cache miss. Since the access request from the CPU 11 is processed sequentially in this case, the read data to be replied to the CPU 11 is also transferred sequentially. Since there does not occur a bank cache hit, the reordering will not be made.

[Mergence of the Access Request]

The response by the DDR-SDRAM controller 10 to access requests for a bank cache non-object area from the graphic bus 20, especially the mergence of the access requests will now be described.

Figure 11:
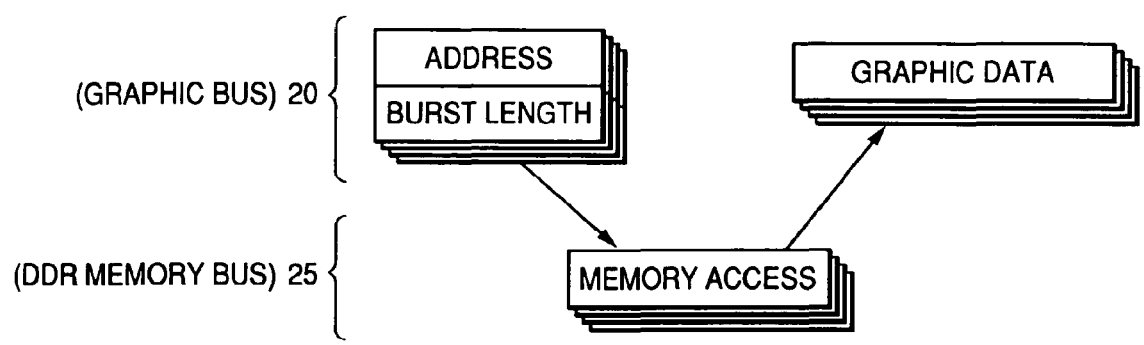
FIG. 11 is a flow chart illustrating a read access flow from a graphic module to the DDR-SDRAM.

FIG. 11 illustrates a read access flow from a circuit module of the graphic bus 20 (also referred to as a graphic module) to the DDR-SDRAM 61. As the address and the burst length are issued to the graphic bus 20 from the graphic module, the memory read access is performed in the DDR-SDRAM 61 through the DDR memory bus 25, and the read data is replied to the graphic bus 20 as the graphic data.

Figure 12:
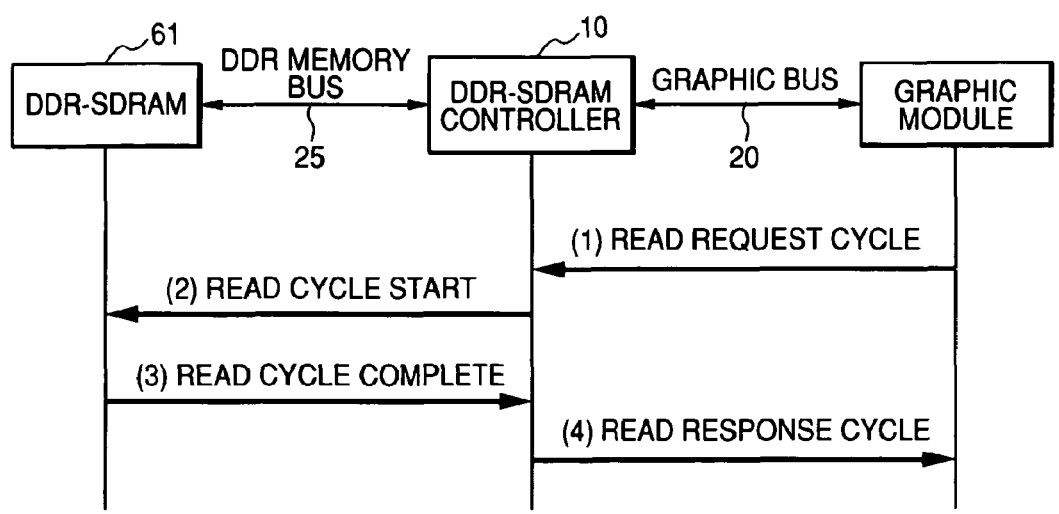
FIG. 12 is a flow chart illustrating a read access operation from the graphic module to the DDR-SDRAM.

FIG. 12 illustrates the operation flow of the read access from the graphic module to the DDR-SDRAM 61.

The read access from the graphic module to the DDR-SDRAM 61 is performed in the following order: (1) read request cycle from the graphic module to the DDR-SDRAM controller 10, (2) read cycle start during which the read command is issued from the DDR-SDRAM controller 10 to the DDR-SDRAM 61, (3) read cycle completion during which the read data is outputted from the DDR-SDRAM 61 to the DDR-SDRAM controller 10 to complete the read cycle, and (4) read response cycle during which the memory read data is replied to the graphic module from the DDR-SDRAM controller 10.

Figure 13:
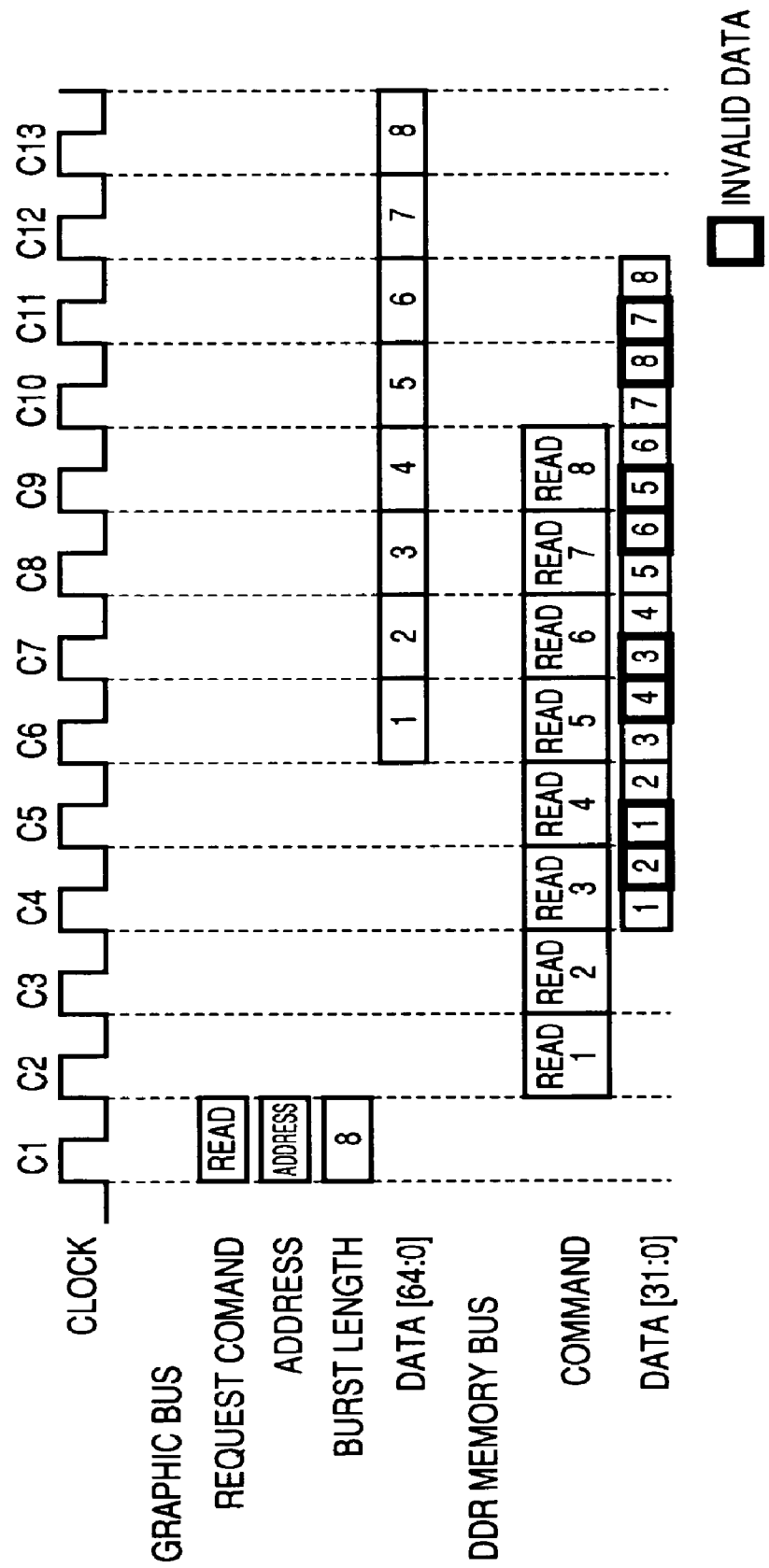
FIG. 13 is a timing chart illustrating an operation that, when there is a read access request with access data size 32-bits and burst length 8 from the graphic module, a merge-join processing of the read access request is not performed.
Figure 14:
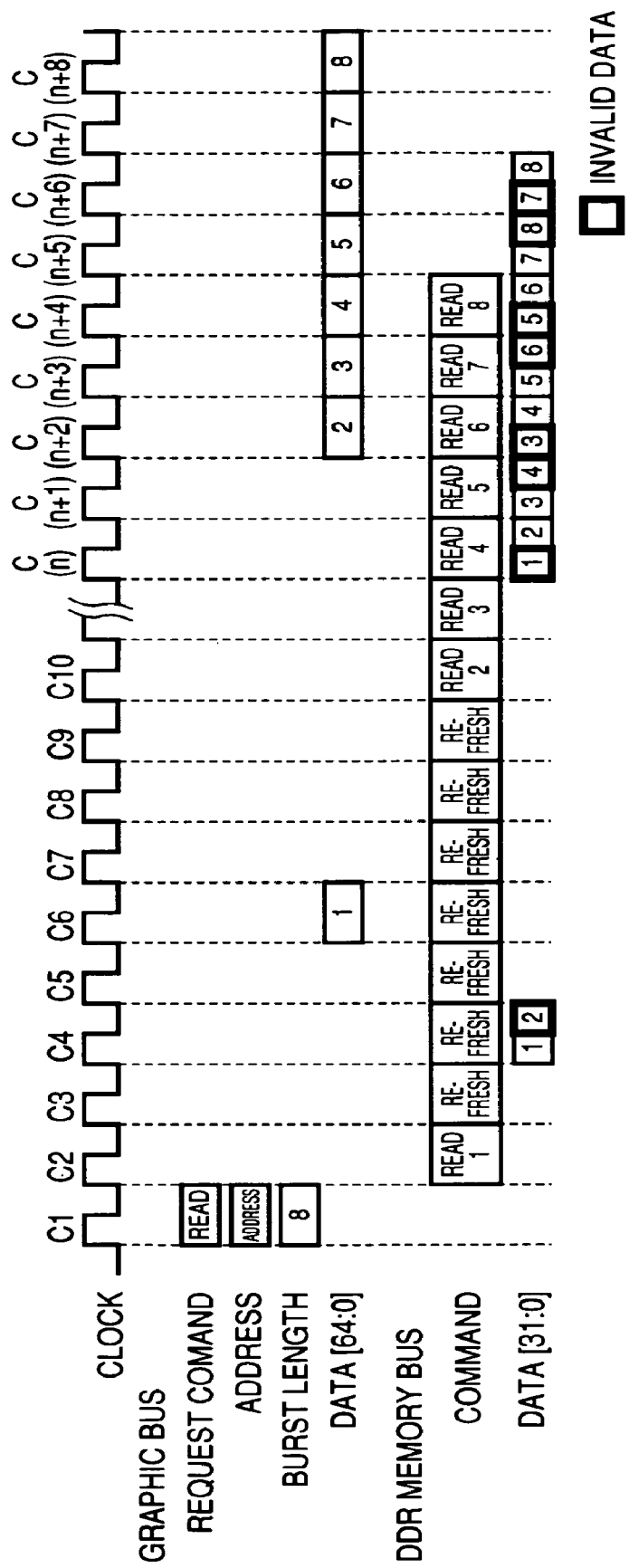
FIG. 14 is a timing chart when there occur refresh cycles to the DDR-SDRAM on the way of the processing in FIG. 13.
Figure 15:
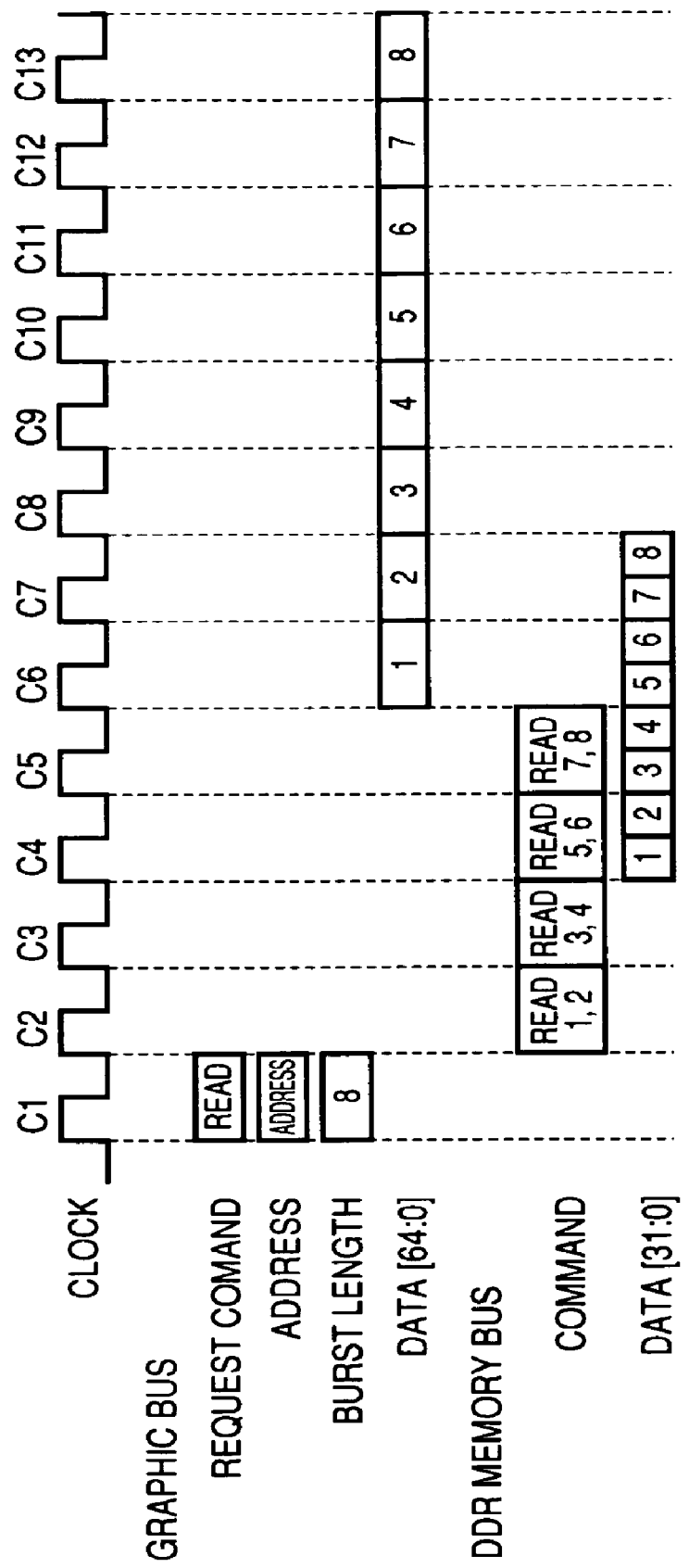
FIG. 15 is a timing chart illustrating an operation in performing a merge-join processing of read access requests and issuing read commands.

FIG. 13 through FIG. 15 illustrate the operation timing when a read access request with access data size 32-bits and burst length 8 is made from the graphic module to the DDR-SDRAM 61. FIG. 13 and FIG. 14 illustrate the case in which the merge-join processing of the read access request is not performed, and FIG. 15 illustrates the case in which the merge-join processing of the read access request is performed.

In FIG. 13, a request command, address, and burst length are issued at the clock cycle C1 from the graphic module to the DDR-SDRAM controller 10 by way of the graphic bus 20. The DDR-SDRAM controller 10 issues read commands at the clock cycles C2 through C9 to the DDR-SDRAM 61 by way of the DDR memory bus 25. The DDR-SDRAM 61 outputs read data at each of half the clock cycles C4 through C11 in units of 32 bits. At this moment, the DDR-SDRAM controller 10 issues read commands by the frequency of the burst length (eight times), and receives the data from the DDR-SDRAM 61 by the frequency of the burst length (eight times). Thus, the DDR-SDRAM controller 10 issues the read commands eight times in order to read the 32-bit data eight times. In response to this, the DDR memory bus 25 outputs the 64-bit data with the addresses continued by splitting two times 32-bit by 32-bit in one clock cycle. Therefore, in case of reading eight times the 32-bit data with the addresses continued as the requested read access, the same data are outputted at the clock cycles C4 and C5, C6 and C7, C8 and C9, and C10 and C11. In this case however, since the data being validated in one read access is 32-bits only, the 32-bit data outputted at the former or latter half of each cycle are invalidated. This means that the same data as those outputted and invalidated at the former cycle is outputted again and validated at the next cycle. In the drawing, the invalidated data are differentiated from the validated data by the thick-line frames. The DDR-SDRAM controller 10 replies the data thus attained to the graphic module by way of the graphic bus 20 at the cycles C6 through C13. This response cycle is performed eight times in correspondence with the frequency of the burst length, and the 32-bit data are transferred each time.

FIG. 14 illustrates a timing chart when there occur refresh cycles to the DDR-SDRAM 61 on the way of the processing in FIG. 13. In the same manner as FIG. 13, after a request command, address, and burst length are issued at the clock cycle C6 from the graphic module, the DDR-SDRAM controller 10 issues read commands to the DDR-SDRAM 61 by way of the DDR memory bus 25 by the frequency of the burst length (eight times) from the clock cycle C2, and receives the data by the frequency of the burst length (eight times) from the clock cycle C4. Here in this case, a refresh command is issued at the clock cycle C3 on the way of the read command being issued eight times. Accordingly, the remaining read commands are issued with a delay after the clock cycle C10, for example. The DDR-SDRAM 61 outputs the data after the refresh cycles are finished. Accordingly, the data corresponding to the read commands issued after the refresh commands are outputted with a considerable delay, in comparison to the case shown in FIG. 13 in which there does not occur a refresh cycle and the data are outputted at the clock cycles C5 through C11. Therefore, in comparison to the case in FIG. 13, the data throughput of the graphic bus 20 is deteriorated considerably.

FIG. 15 illustrates a timing chart when a merge-join processing of the read access requests is performed and the read commands are issued. From the graphic module, a request command, address, and burst length are issued to the DDR-SDRAM controller 10 by way of the graphic bus 20, in the same manner as the case in FIG. 13. The DDR-SDRAM controller 10 issues read commands to the DDR-SDRAM 61 by way of the DDR memory bus 25, and thereby the data are outputted from the DDR-SDRAM 61. Here, in order to effectively use the invalidated data appeared in FIG. 13 and FIG. 14, the DDR-SDRAM controller 10 issues the read commands in a bunch of four read cycles. That is, the DDR-SDRAM controller 10 converts the access requests from the graphic module for reading eight-times the 32-bit data with the addresses continued into the requests for reading the 64-bit data four times, and issues the read commands to the DDR-SDRAM 61. Thereby, in comparison to FIG. 13 increases the interval in which the DDR memory bus 25 is not used for the read access concerned, the interval can be used for the next access, pre-charge, refresh and so forth. Since the clock cycles of the DDR memory bus 25 being used to one request are limited, the probability of the refresh cycles appearing on the way of the memory read access becomes decreased in comparison to the case in FIG. 14. By these reasons, the data throughput of the DDR memory bus 25 is enhanced remarkably.

The read data with the access requests merged are outputted from the DDR-SDRAM 61, which are supplied to the output controller (RDOCNT) 87. The data supplied to the output controller 87 are sliced in the data size that is requested from the graphic module, according to the command from the DDR access controller (ASCNT) 85. The sliced data are supplied to the graphic bus interface (GFBIF) 82 by way of the selector (DSEL) 88, and are transferred in the response packet to the graphic module of the access originator.

In the above merge-join processing of the access requests, the eight-times read accesses of 32-bit data are described as an example. However, it is not limited to this example, and when the number of bits in the data for the access requests to the DDR-SDRAM controller 10 is smaller than the width of the DDR memory bus 25, the data throughput of the DDR memory bus 25 can be enhanced in the same manner. Naturally, the burst length may be a different value.

Next, the operation will be described in case of plural modules requesting accesses to the DDR-SDRAM 61.

Figure 16:
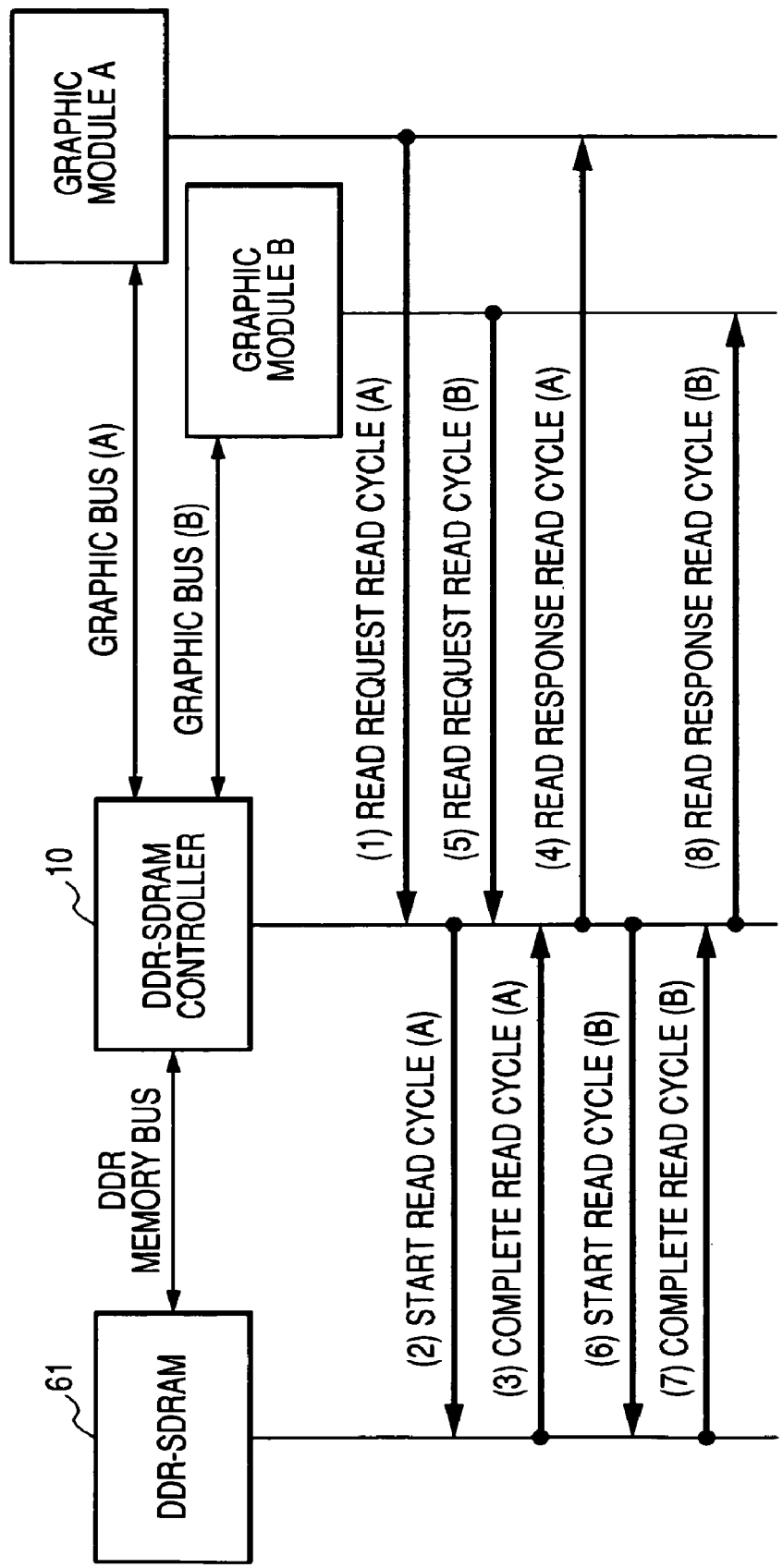
FIG. 16 is a flow chart illustrating an operation when there are read access requests from two graphic modules to the DDR-SDRAM.

FIG. 16 illustrates an operation flow in case there are read access requests from two graphic modules A, B to the DDR-SDRAM 61. In FIG. 16, the read accesses from the two graphic modules A, B to the DDR-SDRAM 61 are performed in the following order: (1) read request cycle (A) from the graphic module A to the DDR-SDRAM controller 10, (2) read cycle (A) start during which the read command corresponding to (1) is issued from the DDR-SDRAM controller 10 to the DDR-SDRAM 61, (3) read cycle (A) completion during which the read data corresponding to (2) is outputted from the DDR-SDRAM 61 to the DDR-SDRAM controller 10 to complete the read cycle (A), (4) read response cycle (A) during which the memory read data is replied to the graphic module A from the DDR-SDRAM controller 10, (5) read request cycle (B) from the graphic module B to the DDR-SDRAM controller 10, (6) read cycle (B) start during which the read command corresponding to (5) is issued from the DDR-SDRAM controller 10 to the DDR-SDRAM 61, (7) read cycle (B) completion during which the read data corresponding to (6) is outputted from the DDR-SDRAM 61 to the DDR-SDRAM controller 10 to complete the read cycle (B), and (8) read response cycle (B) during which the memory read data is replied to the graphic module B from the DDR-SDRAM controller 10. The cycles of (1), (4) are performed by way of the graphic bus (A) of the graphic module A, and the cycles of (5), (8) are performed by way of the graphic bus (B) of the graphic module B. Thus, the different buses are used for the above cycles, and the cycles (1) through (4) and the cycle (5) can be performed at the same time or in the reverse order.

In FIG. 16, before completing the reply to the access request from the graphic module A, the access request from the graphic module B appears. The bus throughputs of the graphic bus (A) and the graphic bus (B) are determined by the bus throughput of the DDR memory bus 25.

Figure 17:
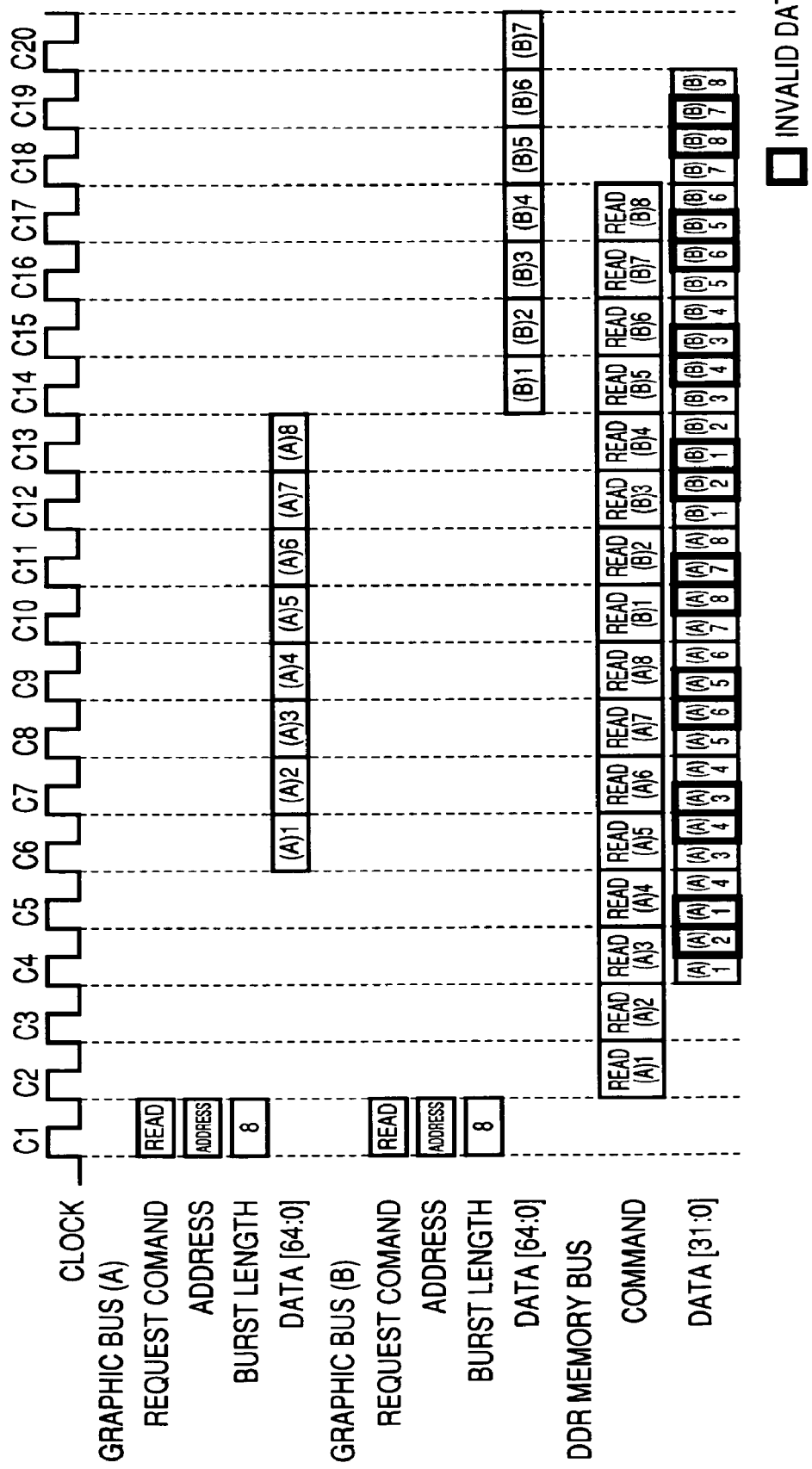
FIG. 17 is a flow chart illustrating an operational timing when there are plural modules requesting memory accesses and the memory access requests are not merged.

FIG. 17 illustrates an operational timing when there are plural modules requesting memory accesses and the memory access requests are not merged The graphic module A and the graphic module B each issue a request command, address, and burst length at the clock cycle C1 to the DDR-SDRAM controller 10 by way of the graphic bus (A) and the graphic bus (B). Here, the access data size is 32 bits. The DDR-SDRAM controller 10 arbitrates the requests from the plural modules by means of the bus arbiter 83. Here, the DDR-SDRAM controller 10 issues access requests in order of the graphic module A and the graphic module B to the DDR-SDRAM 61. In FIG. 17, the DDR-SDRAM controller 10 issues the read commands by the frequency of the burst length (eight times) to the access requests each, and receives the read data by the frequency of the burst length (eight times). This is because to read the 32-bit data eight times needs to issue the read commands eight times. To the graphic module A and the graphic module B, the DDR-SDRAM controller 10 issues the read commands 16 times in total at the clock cycles C2 through C17 and receives the read data 16 times at the clock cycles C4 through C19. In the same manner as the case in FIG. 13, the same data as those outputted and invalidated at the former cycle are read again afterwards to be validated. In this manner, the DDR-SDRAM controller 10 replies the data read 16 times to the graphic module A by way of the graphic bus (A) and to the graphic module B by way of the graphic bus (B). The number of these responses coincides with the frequency of the burst length.

Figure 18:
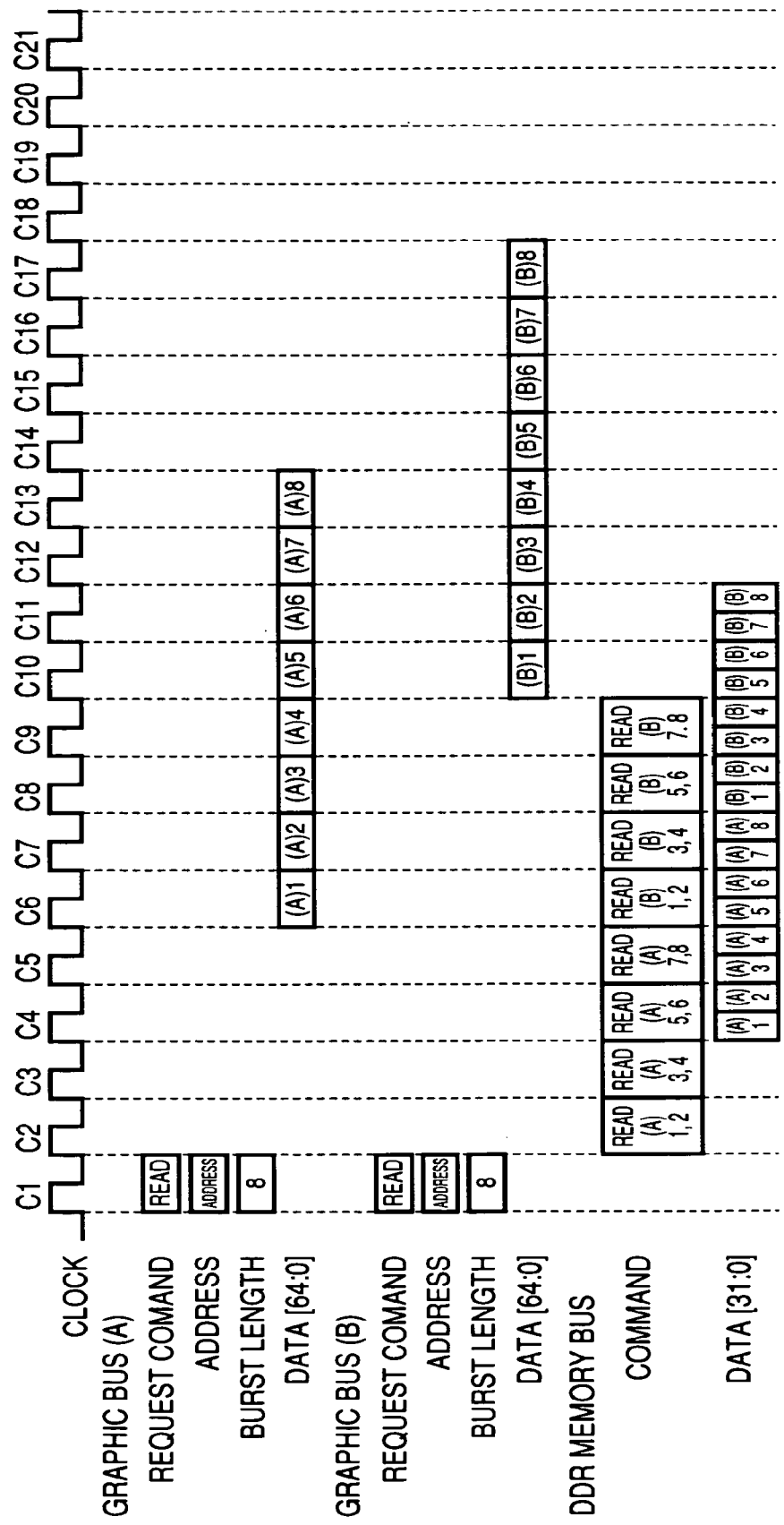
FIG. 18 is a flow chart illustrating an operational timing when there are plural modules requesting memory accesses and the memory access requests are merged.

FIG. 18 illustrates an operational timing when there are plural modules requesting memory accesses and the memory access requests are merged.

The graphic module A and the graphic module B each issue a request command, address, and burst length at the clock cycle C1 to the DDR-SDRAM controller 10 by way of the graphic bus (A) and the graphic bus (B). Here, the access data size is 32 bits. In response to these, the DDR-SDRAM controller 10 arbitrates the access requests from the graphic module A and the graphic module B, and issues access requests in order of the graphic module A and the graphic module B to the DDR-SDRAM 61. In case of FIG. 18, in order to effectively use the invalidated data appeared in FIG. 17, the DDR-SDRAM controller 10 merges the access requests from the graphic module A and the graphic module B for reading eight-times the 32-bit data with the addresses continued into the requests for reading the 64-bit data four times, and issues the read commands to the DDR-SDRAM 61 in each bunch of four read cycles. Thereby, the DDR-SDRAM controller 10 only needs to issue the read commands for eight times in total at the clock cycles C2 through C9 to the DDR-SDRAM 61, and receives the read data of 32 bits×2 eight times at the clock cycle C4 through C11 from the DDR-SDRAM 61. There is not an invalid data in the data received from the DDR-SDRAM 61. Therefore, the data throughput of the DDR memory bus 25 is enhanced in comparison to the case in FIG. 17. Thereafter, the DDR-SDRAM controller 10 replies the read data to the graphic module A and the graphic module B by way of the graphic bus (A) and the graphic bus (B), respectively. This access response is made by the frequency of the burst length (eight times). The graphic bus (A) and the graphic bus (B) are individualized in correspondence with the graphic module A and the graphic module B; therefore, the access response to the graphic module A and the access response to the graphic module B can be performed in parallel. Thereby, the data throughput of the whole system is enhanced.

Figure 19:
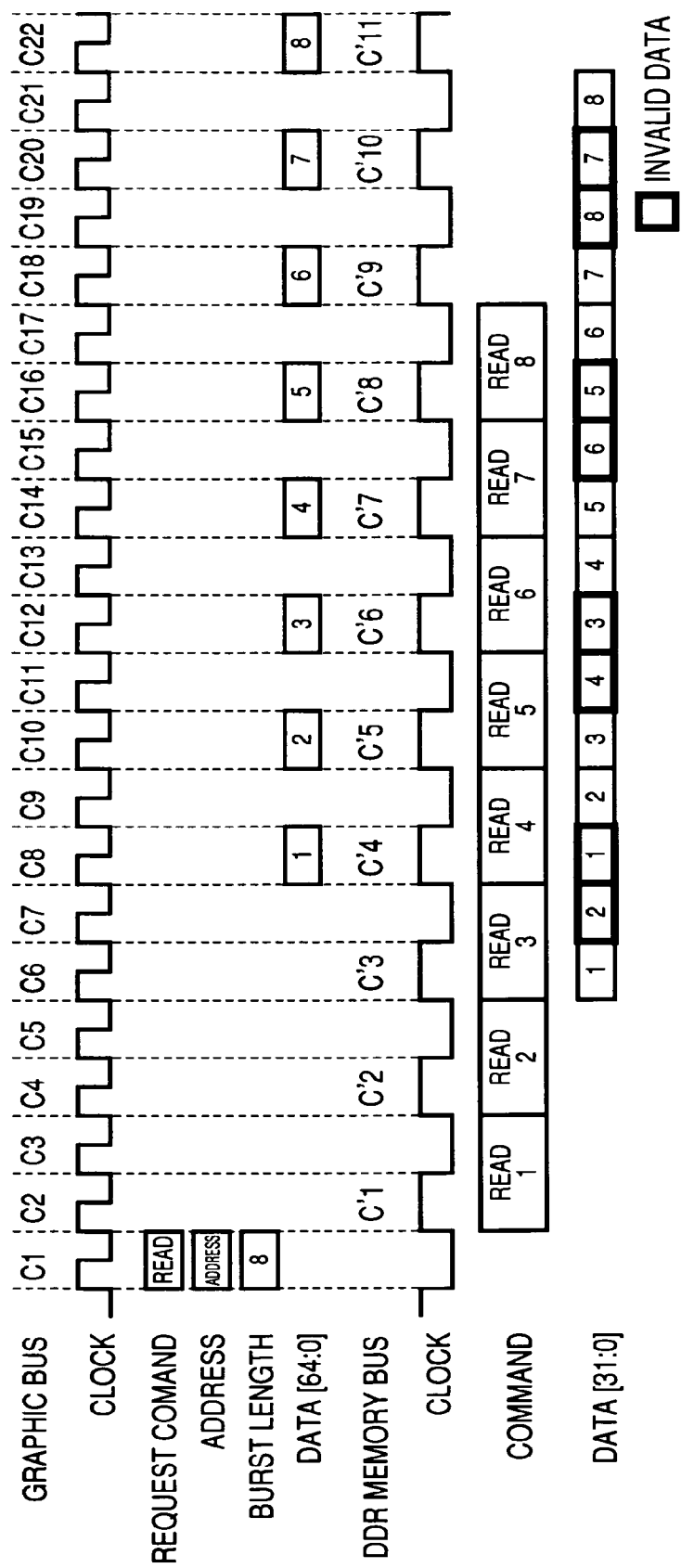
FIG. 19 is a flow chart illustrating an operational timing when the operational frequency of the graphic module is higher than that of the DDR-SRAM and the memory access requests are not merged.

FIG. 19 illustrates an operational timing when the operational frequency of the graphic module is higher than that of the DDR-SRAM 61 and the memory access requests are not merged.

In this case, the operational frequency of the graphic module is double the operational frequency of the DDR-SRAM 61. The graphic module issues a request command, address, and burst length at the clock cycle C1 to the DDR-SRAM controller 10 by way of the graphic bus 20. The data size here is 32 bits. The DDR-SDRAM controller 10 issues read commands at the clock cycles C'1 through C'8 to the DDR-SDRAM 61 by way of the DDR memory bus 25, and receives the read data of 32 bits×2 eight times at the eight clock cycles C'3 through C'10 from the DDR-SRAM 61. Next, the DDR-SRAM controller 10 replies the received read data sequentially to the graphic module by way of the graphic bus; however, the DDR-SRAM controller 10 cannot reply the read data in continuous cycles, because of the rate limiting by a slow data reception from the DDR-SRAM 61. in this case, the data throughput of the graphic bus is deteriorated to a great degree.

Figure 20:
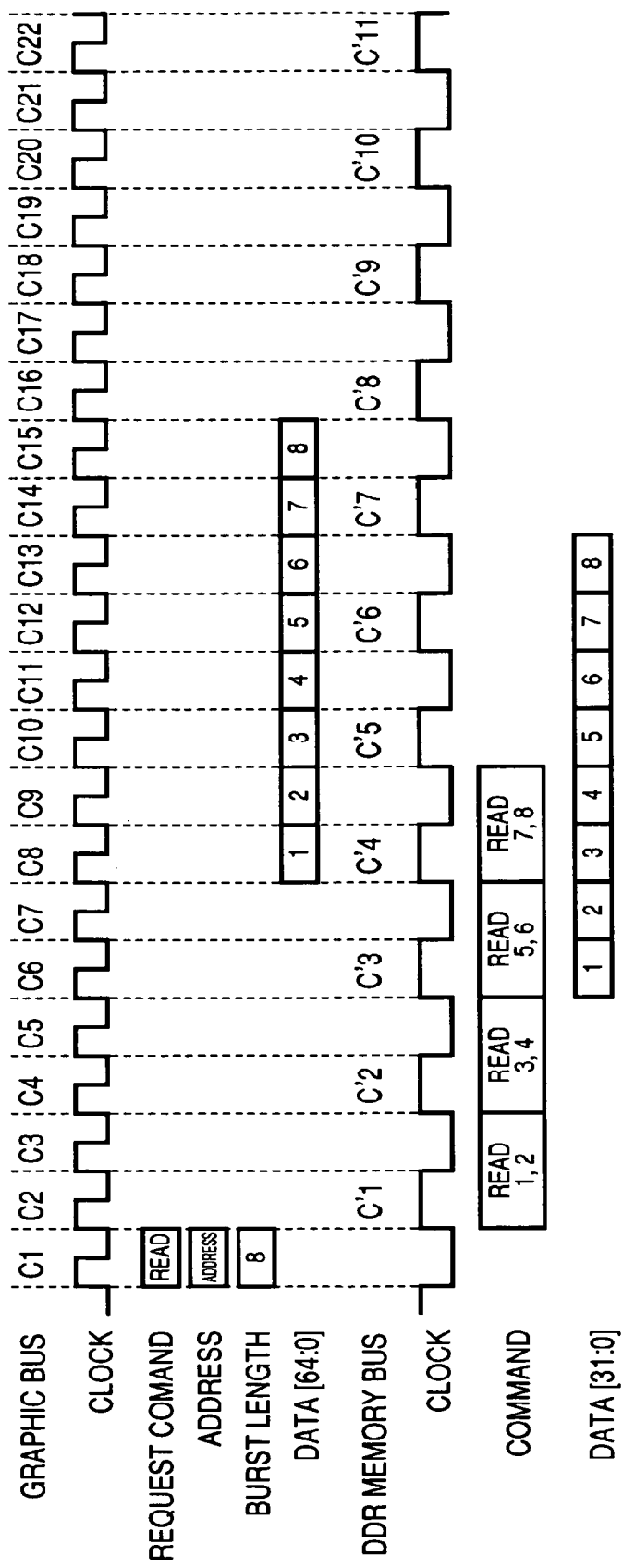
FIG. 20 is a flow chart illustrating an operational timing when the operational frequency of the graphic module is higher than that of the DDR-SRAM and the memory access requests are merged.

FIG. 20 illustrates an operational timing when the operational frequency of the graphic module is higher than that of the DDR-SRAM 61 and the memory access requests are merged.

Here, the operational frequency of the graphic module is double the operational frequency of the DDR-SRAM 61. The graphic module issues a request command, address, and burst length at the clock cycle C1 to the DDR-SRAM controller 10 by way of the graphic bus 20. The data size here is 32 bits. The DDR-SDRAM controller 10 issues read commands to the DDR-SDRAM 61 by way of the DDR memory bus 25. However in this case, the DDR-SDRAM controller 10 merges the access requests for reading eight-times the 32-bit data into the requests for reading the 64-bit data four times, and issues the read commands to the DDR-SDRAM 61 only four times at the clock cycles C'1 through C'4, which is different from the case of FIG. 18. In response to this, the DDR-SDRAM 61 outputs the whole data in units of 32 bits at the four clock cycles C'3 through C'6. The DDR-SRAM controller 10 replies the read data to the graphic module by way of the graphic bus; however in this case, the DDR-SRAM controller 10 is able to reply the read data continuously, without suffering the rate limiting due to the reception timing of the read data from the DDR-SRAM 61. Thereby, the data throughput of the graphic bus is enhanced. Therefore, both the data throughputs of the DDR memory bus 25 and the graphic bus 20 are enhanced, so that the data throughput of the whole system can be enhanced to a great extent.

Also in case there are plural modules requesting accesses to the DDR-SRAM 61 and the operational frequencies of these modules are higher than the operational frequency of the DDR-SRAM 61, it is possible to enhance the data throughputs of the bus and the system by merging the access requests from the modules, although this case is not shown in the drawing.

The bus ID is given to each of the buses such as the super highway bus (SHB) 4 and the graphic bus 20; accordingly, the validity or the invalidity of the bank caches may be set by means of the bus ID. Such a setting may be made fixedly by the logic of the bank cache controller 86, or it may be made to be programmable by means of a control register. This setting facilitates handling a case that it is desirable to determine the cache object in units of buses for enhancing the hit rate of the bank caches.

The super highway bus (SHB) 4 and the graphic bus 20 adopt the split transaction bus of the packet type that determines the access size on demanding accesses. Therefore, it is also advisable to set the valid or invalid access size of the bank caches depending on the access size. Such a setting may be made fixedly by the logic of the bank cache controller 86, or it may be made to be programmable by means of a control register. This setting facilitates handling a case that it is desirable to determine the cache object in units of buses for enhancing the hit rate of the bank caches.

The invention made by the inventors of this application being described in detail based on the above preferred embodiments, this invention is not limited to these embodiments, and it is naturally clear that various changes and modifications are possible without a departure from the sprit and scope of the invention.

For example, the data processor of this invention is not limited to an image processor for a car navigation system; it is widely applicable to an image processor for a printer or a mobile terminal, an processor for a communication control system, an processor for an engine control system, and various types of data processors such as a universal microcomputer and so forth. The bit number of the buses, the data transfer protocol of the buses, the number of the bus lines, and the types of the integrated circuit modules and so forth can be modified variously. The memory having plural banks is not limited to the DDR-SDRAM, and it may be the other memories of the clock synchronous type: such as SDR-SDRAM, DDR-SRAM, and SDR-SRAM, etc.

What is claimed is:

1. A data processor comprising:
   a memory controller adapted to control an external memory having plural banks and a plurality of bank caches, each bank cache corresponding to one of the external memory banks;
   a plurality of buses coupled to the memory controller;
   circuit modules capable of accessing the external memory, each circuit module coupled to a respective one of the buses;
   a central processing unit as one of the circuit modules; and
   a cache memory located between the central processing unit and one of the buses,
   wherein each of the bank caches is capable of storing part of data of the corresponding external memory bank by using corresponding bank addresses as associative keys, and
   wherein the memory controller validates the bank caches in response to an access request for a cache area of the bank caches that is not an objective area of the cache memory, and when the memory controller validates the bank caches to a read access request for the external memory from the circuit modules, if the read access request is an associative miss to the bank caches, the memory controller issues a read command that reads data relating to the read access request for the external memory, and stores the data read by this read command in a corresponding bank cache and outputs the data to a source of the read access request.

2. A data processor according to claim 1, wherein, when the memory controller validates the bank caches in response to a write access request to the external memory from the circuit modules, if the write access request is an associative hit to the bank caches, the memory controller invalidates cache data of the bank caches relating to the associative hit concerned, and issues a write command for write data relating to the associative hit concerned to the external memory.

3. A data processor according to claim 2, wherein, if the write access request is an associative miss to the bank caches, the memory controller issues the write command for the data relating to the associative miss concerned to the external memory.

4. A data processor according to claim 3,
   wherein the plurality of buses includes a first bus and a second bus, and
   wherein the data processor further comprises:
   a three-dimensional graphics module coupled to the first bus;
   a two-dimensional graphics module coupled to the second bus; and
   a display controller coupled to the second bus.

5. A data processor according to claim 1, wherein the plurality of buses includes a bus through which the bank caches are validated to an access request and a bus through which the bank caches are invalidated to an access request.

6. A data processor according to claim 1,
   wherein a bus identification is allocated to each one of the plurality of buses, and
   wherein the memory controller includes a circuit that defines the bus identification of a bus through which the bank caches are validated to an access request and the bus identification of a bus through which the bank caches are invalidated to an access request.

7. A data processor according to claim 1, wherein, when there is an access request from one of the circuit modules, the memory controller determines whether the bank caches are valid or invalid according to the data size of access data accompanying with the access request.

8. A data processor according to claim 7, wherein the memory controller includes a circuit that defines the access data size by which the bank caches are determined as valid or invalid.

* * * * *